United States Patent [19]

Abe et al.

[11] Patent Number: 4,914,562

[45] Date of Patent: Apr. 3, 1990

[54] THERMAL JET RECORDING APPARATUS

[75] Inventors: Nobumasa Abe; Kiyoharu Momose; Koji Watanabe; Yuichi Nakamura; Tsuneo Handa; Mitsutaka Nishikawa, all of Nagano, Japan

[73] Assignee: Seiko Epson Corporation, Japan

[21] Appl. No.: 60,206

[22] Filed: Jun. 10, 1987

[30] Foreign Application Priority Data

| | | | |
|---|---|---|---|
| Jun. 10, 1986 | [JP] | Japan | 61-134187 |
| Jun. 25, 1986 | [JP] | Japan | 61-148651 |
| Jul. 15, 1986 | [JP] | Japan | 61-165751 |
| Aug. 7, 1986 | [JP] | Japan | 61-185570 |
| Sep. 11, 1986 | [JP] | Japan | 61-214322 |
| Sep. 29, 1986 | [JP] | Japan | 61-230748 |

[51] Int. Cl.[4] .......... G01D 15/16; B41J 3/04

[52] U.S. Cl. .......... 346/140 R

[58] Field of Search .......... 346/140

[56] References Cited

U.S. PATENT DOCUMENTS

| | | | |
|---|---|---|---|
| 4,313,124 | 1/1982 | Hara | 346/140 |
| 4,339,762 | 7/1982 | Shirato | 346/140 |
| 4,353,079 | 10/1982 | Kawanabe | 346/140 R |
| 4,463,359 | 7/1984 | Ayata et al. | 346/1.1 |
| 4,514,741 | 4/1985 | Meyer | 346/140 |
| 4,528,577 | 7/1985 | Cloutier et al. | 346/140 R |
| 4,535,343 | 8/1985 | Wright | 346/140 |
| 4,568,953 | 2/1986 | Aoki et al. | 346/140 R |
| 4,587,534 | 5/1986 | Saito et al. | 346/140 R |
| 4,663,640 | 5/1987 | Ikeda | 346/140 |

OTHER PUBLICATIONS

Hewlett Packard Journal, May 1985, vol. 36, No. 5.

*Primary Examiner*—Joseph W. Hartary
*Attorney, Agent, or Firm*—Blum Kaplan

[57] ABSTRACT

A thermal ink jet recording apparatus includes at least a substrate having a gap disposed over an ink reservoir on a base in communication with an ink source. A film circuit of electrodes and heating elements is formed on each substrate. A nozzle plate covering the substrates has a lower step portion and a upper step portion. The upper step portion includes nozzles substantially directly above and corresponding to the plurality of heating elements. Ink which is used for this apparatus includes ionic or non-ionic surface active agents for increasing permeability of the ink on a recording medium.

1 Claim, 22 Drawing Sheets

50

80

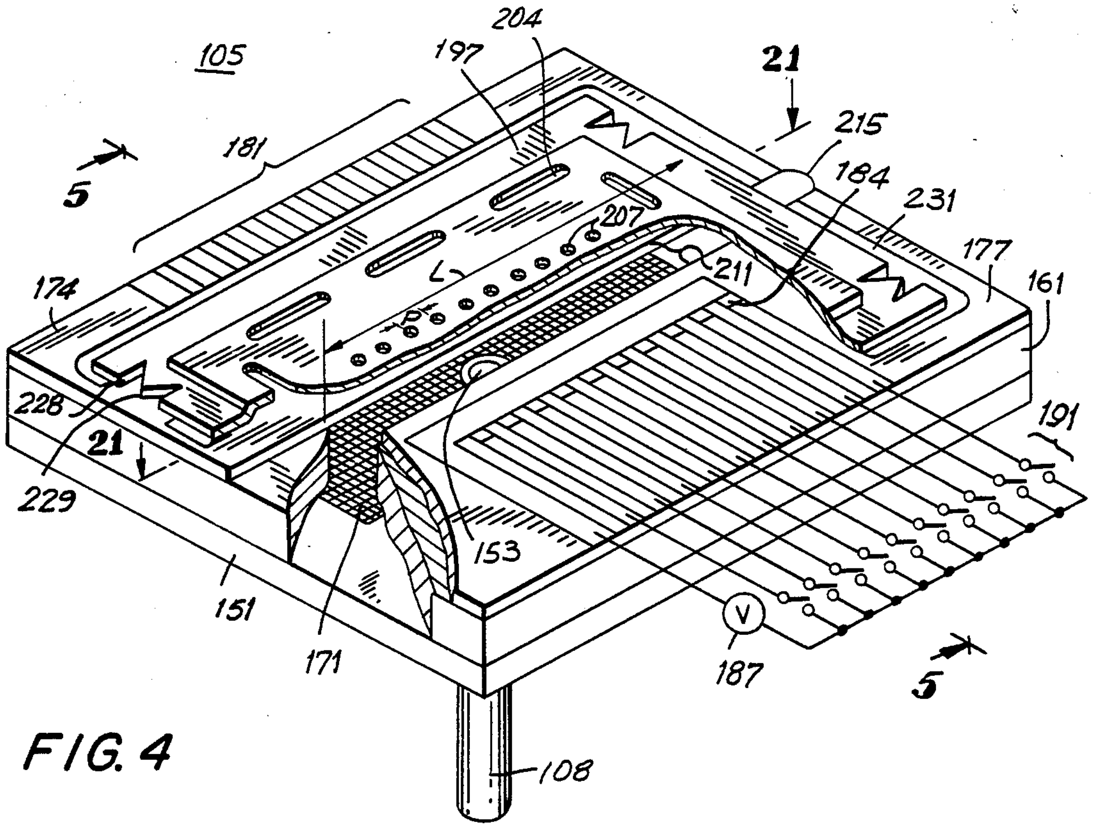
FIG. 4
FIG. 5
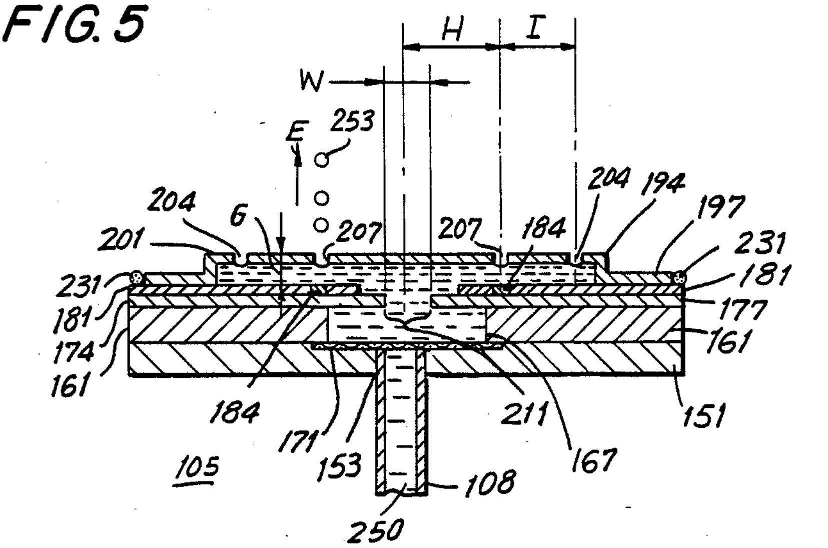

FIG. 8
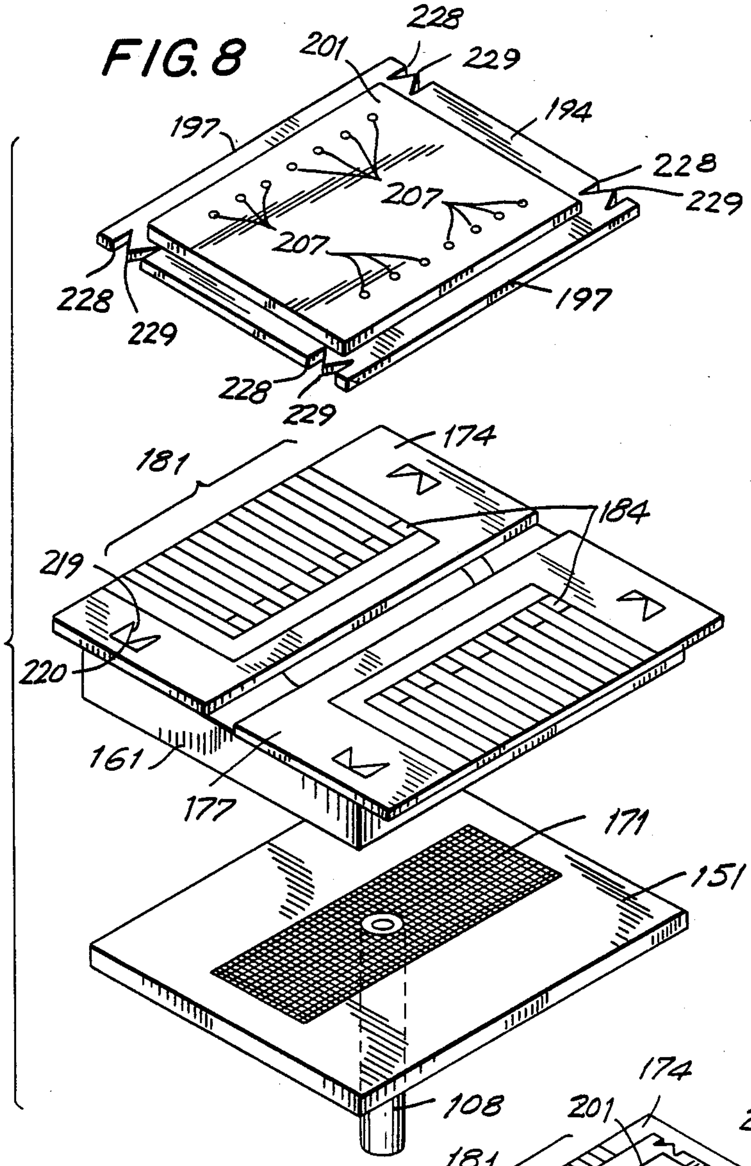
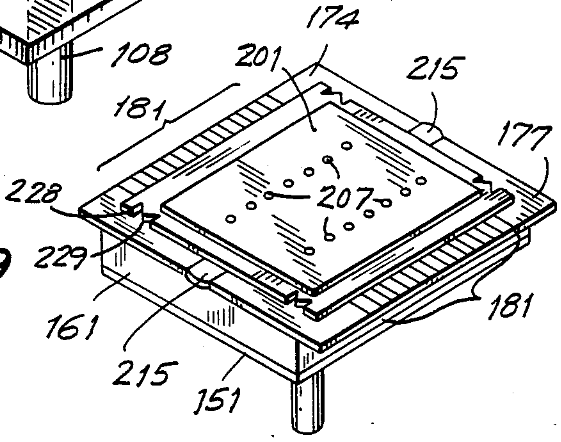
FIG. 9

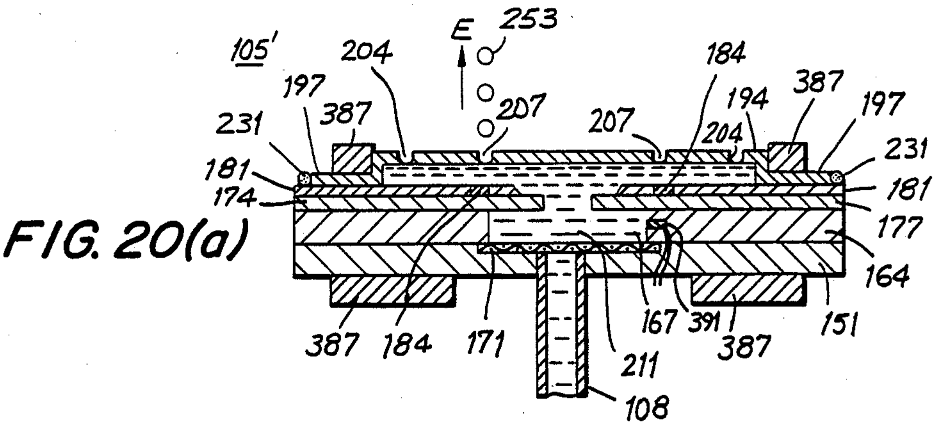
FIG. 20(a)
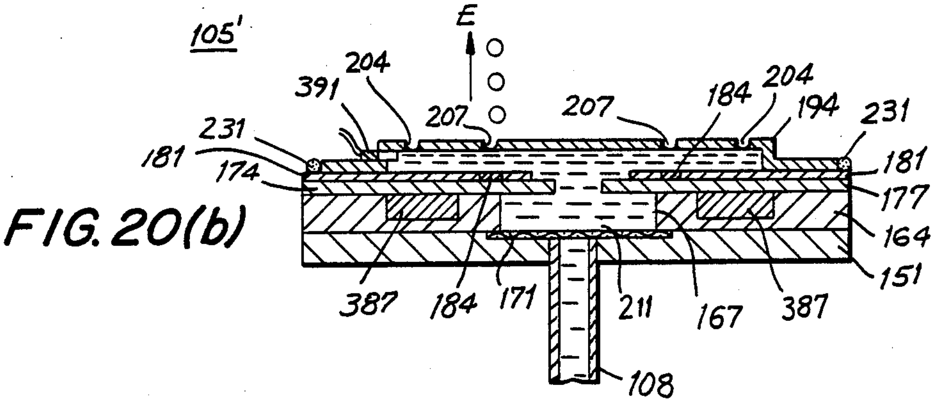
FIG. 20(b)
FIG. 21
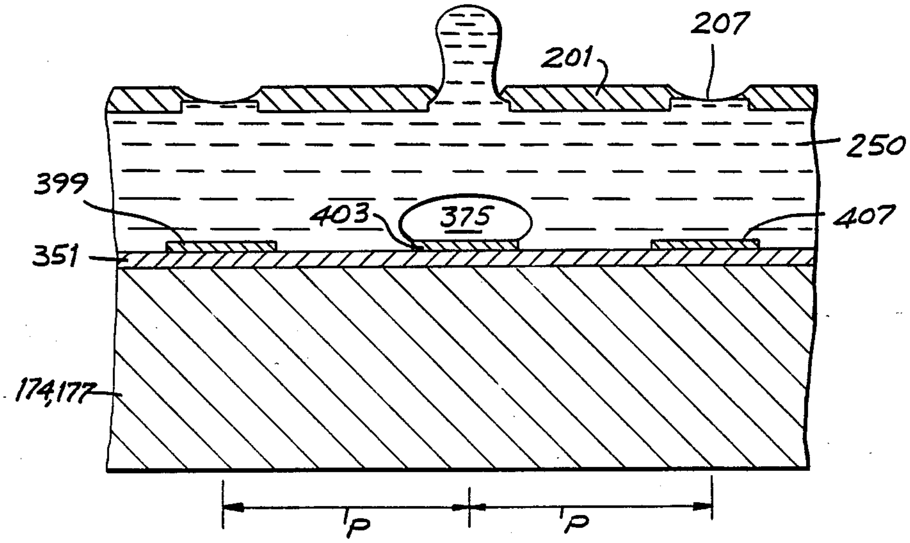

THERMAL JET RECORDING APPARATUS

BACKGROUND OF THE INVENTION

This invention relates generally to an ink jet recording apparatus which ejects ink through a plurality of nozzles supplied by an ink reservoir, and especially to a thermal ink jet recording apparatus which ejects ink through a plurality of nozzles without the need for separators between nozzles and an improved ink composition for use in the apparatus.

Thermal ink jet recording apparatus are well known in the art and provide high speed and high density ink jet printing having a relatively simple construction. Conventional ink jet recording apparatus and methods are described in the May, 1985 issue of the Journal of the U.S. Hewlett-Packard Company, hereinafter referred to as the Hewlett-Packard Journal, as well, as in U.S. Pat. Nos. 4,353,079; 4,463,359; 4,528,577; 4,568,953 and 4,587,534.

The recording speed and density at which such conventional ink jet recording apparatus operate is limited. In order to protect the pressure of the heated ink underneath any one particular nozzle from affecting the pressure of ink under an adjacent nozzle, a barrier is placed between adjacent nozzles to prevent pressure interference. These barriers must be very thin in order to accommodate a plurality of nozzles on one recording head. Nevertheless, the pitch (i.e., spacing) between adjacent nozzles is still limited because of the need to place a barrier, no matter how thin, between each adjacent nozzle.

Additionally, thin film circuitry is covered by a protective layer of a hard insulated inorganic matter for protecting the heating elements and electrodes which are used to heat the ink from electrical, chemical, thermal and/or acoustic damage. This protective layer acts as a heat sink requiring more heat than would otherwise be required in order to reheat the ink to an appropriate temperature for ejection of the ink through the nozzles. This requires a longer period of time to heat the ink thereby reducing the speed at which the apparatus records. Further, small structural defects such as minute cracks in the protective layer can leave the thin film circuitry unprotected. Since it is difficult to produce protective layers without such small structural defects, the reliability of conventional thermal ink jet apparatus can be quite low.

It is also difficult to control the thickness of the protective layer during its manufacture. The thicker the protective layer, the less responsive the protective layer is to changes in the temperature of the heating element which it covers. Consequently, the heating element cools off much more quickly than the protective layer resulting in the ink adhering to the protective layer. As ink begins to build up heat conduction from the heating element to the ink is adversely affected and can eventually result in the inability to cause the ejection of ink through the nozzles.

The ink jet recording apparatus described in the HewlettPackard Journal includes a nozzle plate which covers a substrate on which the electrodes and heating elements are disposed. This nozzle plate, which is made by Ni electroforming, includes minute projecting portions provided on the interior surface thereof for ensuring that a gap of a predetermined height exists between the nozzle plate and substrate. The height of the gap is important to the operation of the ink jet recording apparatus since the amount of ink to be heated depends on the ink trapped within the gap. These minute projecting portions also must be of uniform height to ensure that the ink ejected through each nozzle inpinges the recording medium with the same desired inpact. In view of the foregoing it is essential to provide these minute projecting portions which makes manufacture of the nozzle plate difficult. The substrate and nozzle plate are adhesively bonded. The adhesive bonding material which deteriorates when contacted by ink and deposits can clog the nozzles of the nozzle plate adversely affecting the operation of the apparatus.

In addition to the above problems, the recording paper used for prior art ink jet recording apparatus varies significantly in the pulp, filler or other materials which are contained therein and in its manufacturing process (e.g., wire part, size press). Wood free paper such as described in the Hewlett-Packard Journal is widely used for ink jet recording apparatus. Other wood free paper applicable for use as a recording medium for thermal ink jet recording apparatus include, Japanese Industrial Standards for print A, drawing paper (such as document and Kent paper) and coated paper. Unfortunately, conventional ink has a tendency to significantly blot/spatter wood free paper and thus hinders achieving high quality printing.

Accordingly, it is desirable to provide an ink jet printer having a simplified construction which eliminates the need for barriers between adjacent nozzles. It is also desirable to provide an ink composition suitable for use in the ink jet printer which avoids the blotting problem on wood free paper generally associated with conventional ink compositions.

SUMMARY OF THE INVENTION

In accordance with the invention, a recording apparatus for ejecting ink through nozzles of the apparatus onto a recording medium includes a base having a reservoir, a pair of substrates disposed on the base and separated from each other so as to form a gap therebetween, a plurality of heating elements disposed on the pair of substrates, at least one nozzle plate having a plurality of nozzles and overlying the plurality of substrates, and an ink source in communication with the reservoir. The heating elements are generally positioned on the substrates to form rows on both sides of the gap. The nozzle plate has a lower and upper step portion. The nozzles extend through the upper step portion and are substantially directly above the plurality of heating elements so as to form rows on both sides of the gap. In one preferred embodiment, the heating elements are made from Ta-N-$SiO_2$ or Ta-$SiO_2$.

In order to minimize damage to the heating elements due to concentrated shock waves produced during contraction of air bubbles in the ink, the heating elements are constructed to (i) substantially avoid the air bubbles collapsing near the geometric center of the heating elements, (ii) provide a number of parallel paths for current flow through each heating element, or (iii) include a protective film of approximately 5$\mu$m or greater in thickness covering the central portion of the element. Maintaining the temperature of the ink surrounding the heating elements at approximately 70° C. and above also minimizes the damage created by the concentrated shock waves.

Current is supplied to adjacent heating elements in a staggered (i.e., time delayed) manner maintaining at least about a 30–40μsec difference between energizations of adjacent heating elements. The nozzles overlying the heating elements on each side of the gap are preferably slightly offset from each other in order to provide high speed printing while compensating for the staggered time delay in energizing adjacent heating elements.

Additionally, high quality printing is achieved using an ink having an ionic or non-ionic surface active agent for increasing the permeability of the ink to the recording paper. Alternatively, the recording paper can be preheated and postheated in order to quickly dry and fix the swollen ink droplets.

Accordingly, it is an object of this invention to provide a high speed and high density thermal ink jet recording apparatus which is more reliable and durable than presently available.

It is another object of the invention to provide a thermal ink jet recording apparatus which prevents pressure interference from adjacent heating elements without the use of barriers.

It is another object of the invention to increase the life expectancy of the heating elements used in a thermal ink jet recording apparatus without having to cover the heating elements and electrodes with a protective layer.

It is another object of the invention to provide a blot free ink for use on a wood free paper.

It is another object of the invention to provide a thermal ink jet recording apparatus which is not restricted in the pitch between nozzles due to barriers between adjacent nozzles.

It is still another object of the invention to provide a thermal ink jet recording apparatus which prevents ink from contacting the adhesive bond holding the nozzle plate to the substrates.

It is yet another object to provide a nozzle plate for a thermal ink jet recorder which is far easier to manufacture than presently available.

It is still another object of the invention to provide a means for preheating and postheating recording paper so that ink droplets are quickly dried and fixed while in a swollen condition.

Still other objects and advantages of the invention will in part be obvious and will in part be apparent from the specification.

The invention accordingly comprises several steps and the relation of one or more of such steps with respect to each of the others, and the device embodying features of construction, combination of elements and arrangements of parts which are adapted to effect such steps, all is exemplified in the following detailed disclosure, and the scope of the invention will be indicated in the claims.

BRIEF DESCRIPTION OF THE DRAWINGS

For a fuller understanding of the invention, reference is made to the following description taken in connection with the accompanying drawings, in which:

FIG. 4 is a perspective view partially in cross-section of a thermal ink head shown in FIG. 3;

FIG. 5 is a cross-section view of the head taken along lines 5—5 of FIG. 4;

FIG. 8 is an exploded perspective view of the substrates and base of FIG. 7, a nozzle plate, base plate, filter and ink supply line;

FIG. 9 is a perspective view similar to FIG. 4 of the assembled recording head of FIG. 8;

FIGS. 20(*a*) and (*b*) are side elevational views in crosssection of a recording head in accordance with alternative embodiments of the invention;

FIG. 21 is a fragmentary side elevational view in crosssection of the recording head taken along lines 21—21 of FIG. 4;

DETAILED DESCRIPTION OF THE PREFERRED EMBODIMENTS

Figure 1:
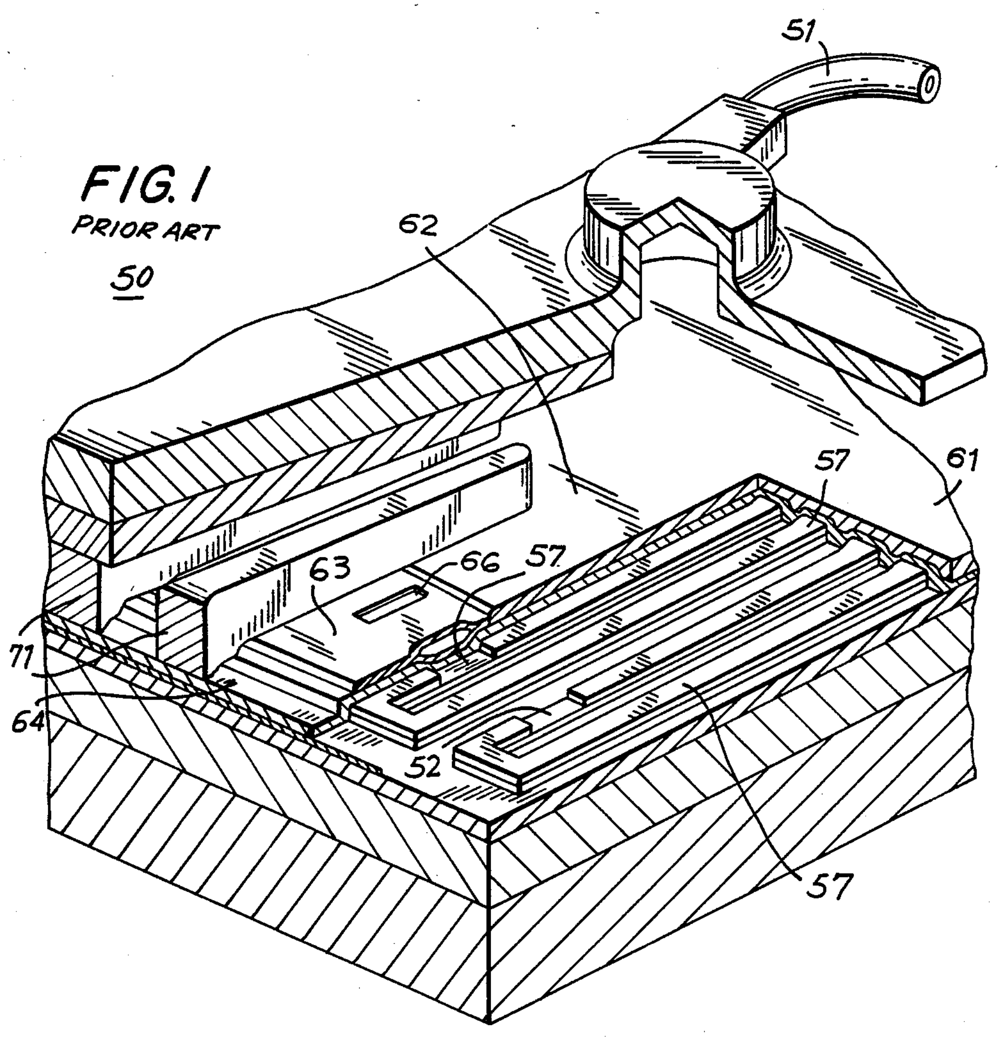
FIG. 1 PRIOR ART
FIG. 1 is a fragmentary perspective view partially in cross-section of a conventional thermal ink jet recording head.
Figure 2:
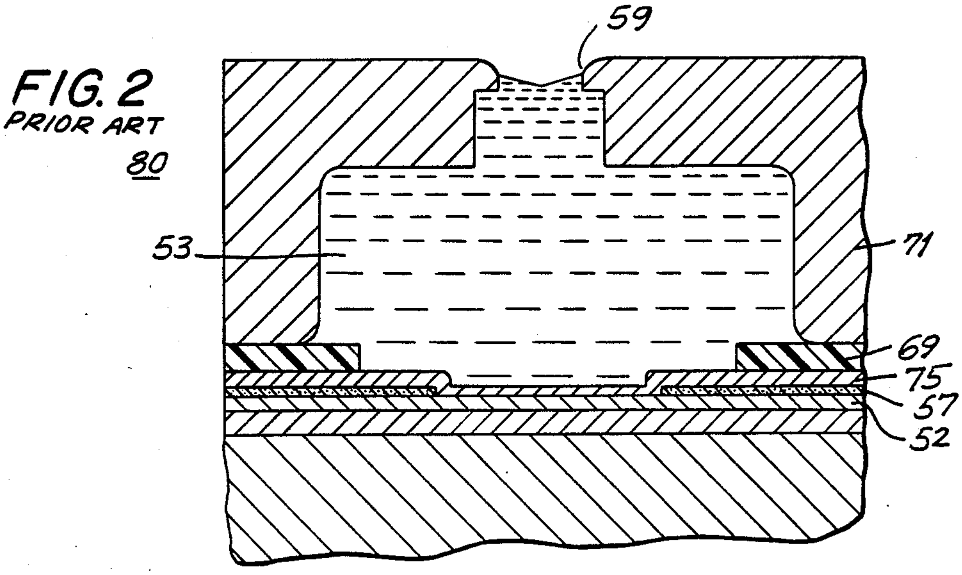
FIG. 2 PRIOR ART
FIG. 2 is a fragmentary cross-sectional view of another conventional thermal jet recording head.

FIGS. 1 and 2 illustrate conventional recording heads 50 and 80 of thermal ink jet recording apparatus manufactured by Canon Kabushiki Kaisha and Hewlett-Packard Company, respectively. As shown between FIGS. 1 and 2, an ink supply conduit 51 provides ink 53 to a reservoir 61. Heating elements 52 are in electrical contact with electrodes 57 through which current flows to heat elements 52. Ink 53 within reservoir 61 is heated by heating elements 52 to raise the pressure of ink 53 directly underneath nozzle 59 for ejecting ink 53 through nozzles 59 and onto a recording medium. As shown in FIG. 1, heating elements 52 and electrodes 57 are covered by an antioxidizing layer 64 on top of which is an absorbing layer 63. Layer 63 is covered by a layer 62 for preventing corrosion of a photosensitive resin 69 (shown only in FIG. 2). Windows 66 directly above heating elements 52 and below nozzles 59 provide openings through which heated ink 53 expands. A plurality of barriers 71 are placed between adjacent nozzles 59 to transform reservoir 61 into a plurality of separated ink wells with one well dedicated to each nozzle 59. Barriers 71 thereby eliminate inadvertent ejection of ink due to pressure interference between adjacent nozzles (hereinafter refered to as cross talk). A thin film 75, shown in FIG. 2, typically made of an inorganic material covers and is next adjacent to heating elements 52 and electrodes 57 to protect the latter from electrical, chemical, thermal and acoustic damage.

As mentioned heretofore, barriers 71 must be made minutely and even then limit the pitch/spacing between adjacent nozzles 59. Furthermore, and as previously noted, film layer 75 due to acting as a heat sink dissipates the heat generated by heating element 52 more quickly than may be desired. Consequently, more heat may need to be generated by heating element 52 then would otherwise be necessary if layer 75 were not present. Inasmuch as the protection afforded by film layer 75 is significantly negated in the event of a structural defect therein, it is necessary to provide a fairly thick film layer which, of course, accentuates the heat sink affect of film layer 75. Film layer 75 also exhibits thermal hysteresis, that is, when the voltage applied to electrodes 57 has a high frequency, the temperature of layer 75 lags behind the temperature of heating element 52. Consequently, as the temperature of heating element 52 is reduced by lowering the current flowing through electrodes 57, ink 53 begins to stick to the hotter surface of protective layer 75. Accordingly, heat conduction from heating element 52 to ink 53 deteriorates and can eventually prevent ejection of ink 53 through nozzles 59. The foregoing drawbacks in the prior art are overcome by device 100 as will now be discussed.

Figure 3:
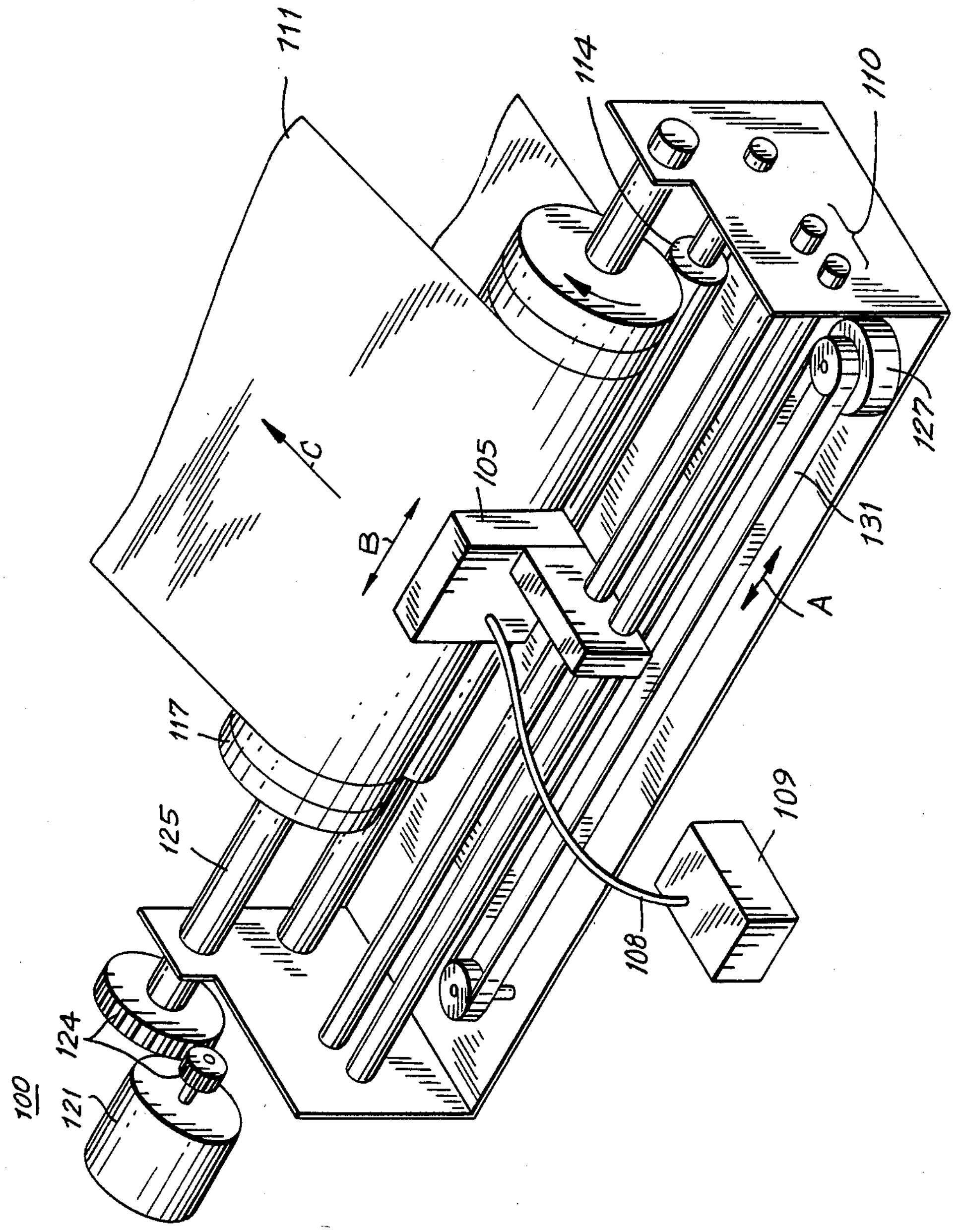
FIG. 3 is a fragmentary perspective view of a thermal ink jet recording apparatus in accordance with one embodiment of the invention.
Figure 6:
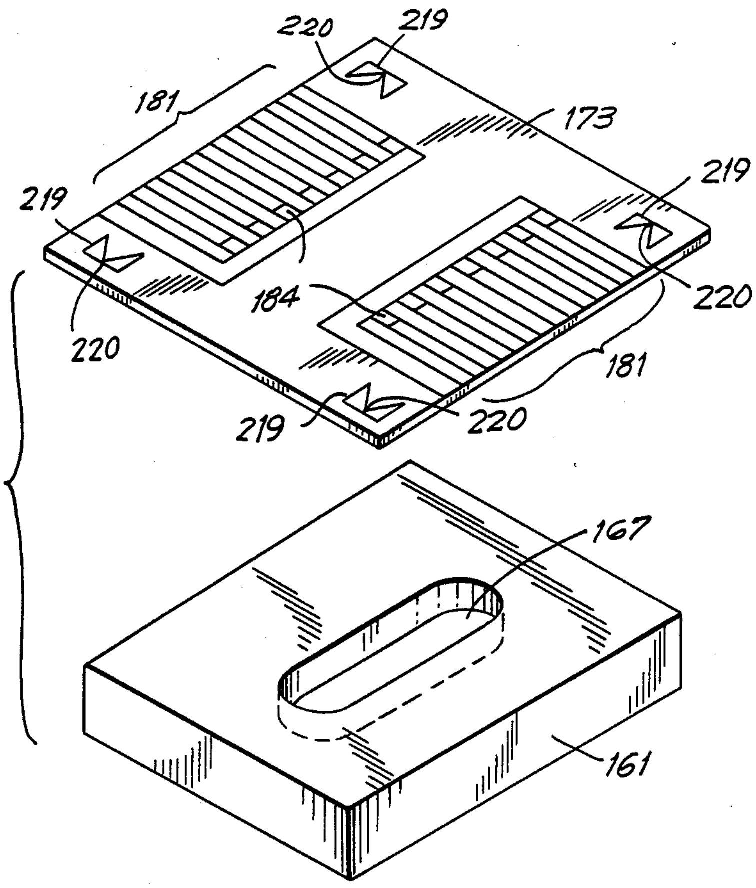
FIG. 6 is an exploded perspective view of the substrate, film circuit formed thereon and base of the recording head of FIG. 4.

Referring now to FIG. 3, a portion of an ink jet recording apparatus 100 includes a recording head 105 which is supplied with an ink 250 (not shown) from an ink source 109 through a pipe 108. Head 105 is coupled to a carriage guide 110. Information is recorded onto a recording medium 111 by head 105. Recording paper 111 is advanced (in a direction denoted by arrow C) by traveling between a guide roller 114 and a platen 117; the latter of which is driven by a paper feed motor 121 via a gear 124 and shaft 125 in a direction denoted by an arrow D. Advancement of paper 111 in a direction C is synchronized with a reciprocating motion denoted by an arrow B of recording head 105. A carriage motor 127 having a carriage belt 131 travels in a reciprocating motion denoted by arrow A. Recording head 105 is operably coupled to carriage belt 131 to provide the reciprocating motion denoted by arrow B.

Head 105 which is shown in greater detail in FIGS. 4 and 5, includes a plate 151 having an opening 153 to which pipe 108 is connected. A base 161 made of resin or metal is integrally connected and disposed above plate 151 and has an opening therein which serves as a reservoir 167. Reservoir 167 is centered about opening 153. A filter 171 is disposed on the top surface of plate 151 covering opening 153. A pair of substrates 174 and 177 are separated from each other to form a gap 211 therebetween and connected to base 161 with a portion of each substrate extending over reservoir 167. The distance separating substrates 174 and 177, that is, the distance of gap 211, is denoted by distance W shown in FIG. 5 and is preferably between 100–500μm. A plurality of electrodes 181 and heating elements 184, which hereinafter are referred to as thin film circuitry, are disposed on substrates 174 and 177. Electrodes 181 are electrically serially connected to heating elements 184. A voltage source 187 is electrically serially connected to electrodes 181 and heating elements 184 through a corresponding plurality of switches 191. A stepped nozzle plate 194 is disposed on top of and connected to substrates 174 and 177. Nozzle plate 194 has a lower step portion 197 and an upper step portion 201. The outer perimeter of lower step 197 is substantially rectangular, is connected to and covers most of the top surface of substrates 174 and 177 except near the edges of substrates 174 and 177. Upper step portion 201 includes a plurality of air vent holes 204 and a plurality of openings which serve as and form rows of nozzles 207. Each nozzle 207 is substantially directly above a heating element 184 such that their center lines are coincident. The pitch P between adjacent nozzles and between adjacent heating elements is preferably about 100μm or greater. Nozzles 207 preferably have diameters of about 10–100μm and desirably of about 30–60μm based on recording densities and solid-state properties of ink. These solid-state properties include viscosity, surface tension and mixing ratio of coloring materials. The straight line distance between the center line of gap 211 which extends in a direction perpendicular to the plane formed by upper step portion 201, and the center of nozzle 207 is represented by H. Distance H is preferably about 100–800μm. The centers of nozzle 207 and the nearest air vent hole 204 is separated by a straight line distance I which is preferably about 100–700μm. A perpendicular distance G between the bottom surface of upper step portion 201 of nozzle plate 194 and electrode 181 is preferably about 15–80μm and desirably about 25–40μm. Plate 151 and base 161 have substantially rectangular block shapes. Gap 211 has a length L as measured in the direction in which the rows of heating elements 184 and nozzles 207 extend. A sealant 215 such as a thermoset sealing compound is used to provide a seal to fill that portion of gap 211 existing at the entrance to nozzle plate 194 so as to prevent leakage of ink therethrough.

Figure 7:
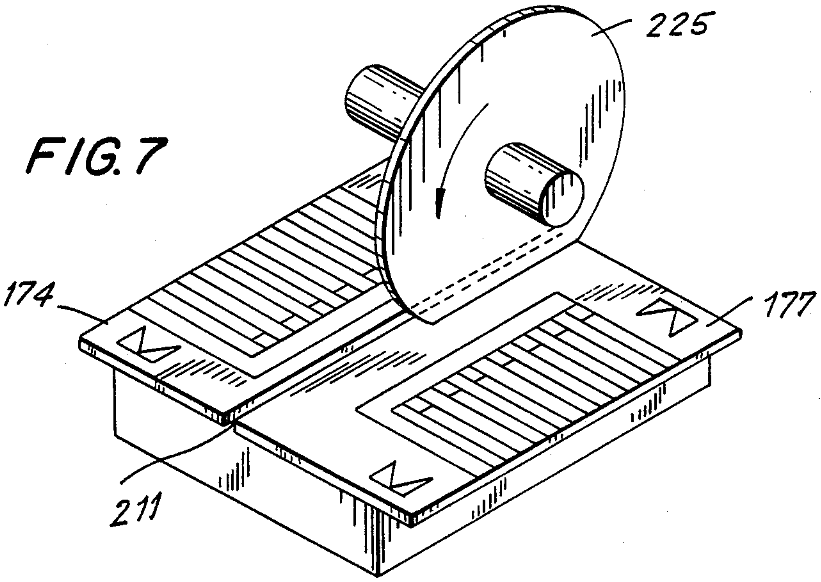
FIG. 7 is a fragmentary perspective view of the substrate and base of FIG. 6 joined together with the substrate being cut to form two separate substrates.

Construction of recording head 105 is as follows. A substrate 173 having a substantially flat rectangular block shape with a thin film circuit of electrodes 181 and heating elements 184 formed thereon is adhesively bonded to base 161. A registration mark 219 is located near each of the four corners of substrate 173 with an apex of each registration mark 220 located at a predetermined distance of about 1–3μm from the nearest row of heating elements 184. Registration marks 219 are formed during manufacture of the thin film circuitry. A cutting element such as, but not limited to, a dicing saw 225 is then used to cut substrate 173 into substrates 174 and 177 with gap 211 therebetween as shown in FIG. 7.

After the swarfs produced in cutting substrate 173 are removed by, for example, ultrasonic cleaning, nozzle plate 194 is adhesively bonded to substrates 174 and 177 as shown in FIG. 8. Prior to bonding, nozzle plate 194 is positioned on substrates 174 and 177 such that apexes 220 of registration marks 219 coincide with a plurality of apexes 229 of registration marks 228 on nozzle plate 194. Registration marks 228 are formed during manufacture of nozzle plate 194 by electroforming and press-etching and the like. Furthermore, apexes 229 of registration marks 228 are located at a predetermined distance of about 2–6μm from nozzles 207. Consequently, heating elements 184 are substantially directly (i.e., within a tolerance of 3–9μm underneath nozzles 207. As can be readily appreciated, it is preferable to provide registration marks on lower step portion 197 of nozzle plate 194 rather than on upper step portion 201 to avoid any error due to parallax. Of course, the position of registration marks 219 and 228 shown near the corners of substrate 173 and lower step portion 197 of nozzle plate 194, respectively, have been set forth for explanatory purposes only. These registration marks can be repositioned in other suitable locations provided the necessary alignment of heating elements 184 with nozzles 207 can be obtained. Nozzle plate 194 and substrates 174 and 177 are bonded together with an adhesive 231 (shown in FIG. 4) near the edge of lower step portion 197 such that ink 250 cannot contact adhesive 231 during operation of recording head 105. Thereafter, plate 151 with filter 171 already positioned thereon is attached to base 161. Finally, sealant 215 is provided to seal gap 211 between substrates 174 and 177 at the entrance to nozzle plate 194 to prevent ink leakage therethrough. The assembled recording head 105 is shown in FIG. 9.

Referring once again to FIG. 5, operation of recording head 105 is as follows. Ink 250 is provided by source 109 through pipe 108 past filter 171 to reservoir 167 as well as all other areas under upper step portion 201 of nozzle plate 194. Any air which may be within reservoir 167 or otherwise under upper step portion 201 escapes through air vents 204. When a particular nozzle 207 is required to eject ink therethrough, the corresponding heating element 184 is heated by closing a corresponding switch 191. Ink 250 begins to expand due to the heat generated by element 184 raising the temperature of ink 250 next to heating element 184 to near its boiling point resulting in the ejection of ink through the desired nozzle 207 as represented by dots of ink 253 in a direction shown by arrow E. The area heated by each heating element 184 preferably is between about three to twenty times the aperture area of each nozzle 207. Based on the foregoing, recording head 105 having 24 or 32 nozzles can eject 180 or 240 dots per inch (dpi), respectively.

Figure 10:
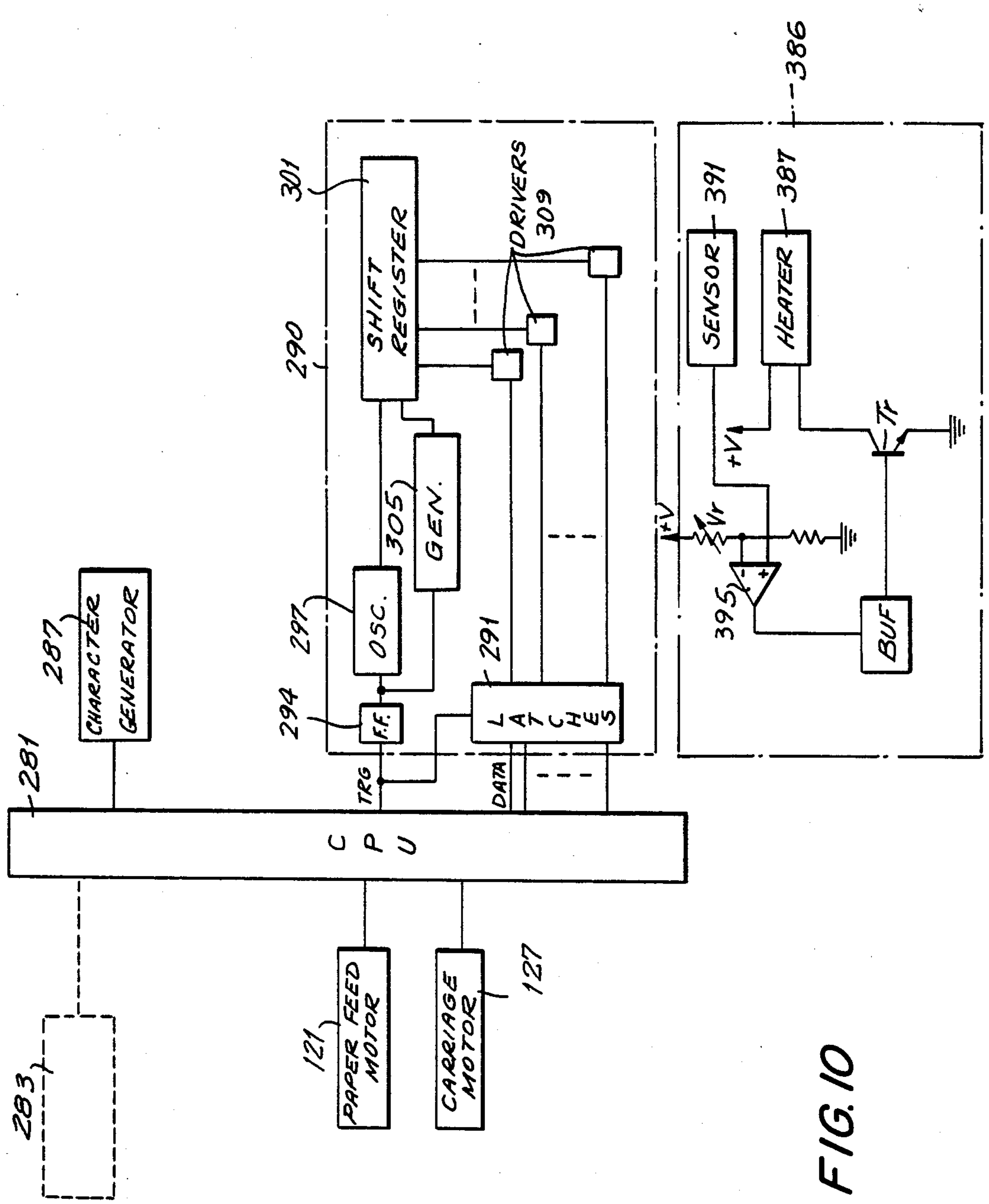
FIG. 10 is a block diagram of a time-sharing drive circuit CPU and other circuitry of the apparatus.

Current is intermittently supplied to each heating element 184 through a corresponding switch 191 and electrode 181. A timesharing driving circuit 290 which provides this intermittent flow of current to each heating element 184 is shown in block diagram form in FIG. 10. A central processing unit (CPU) 281 tied to a host computer 283 controls the operation of circuit 290 as well as other circuitry within apparatus 100 such as the circuitry associated with paper feed motor 121 and carriage motor 127. Recording data for selecting which of switches 191 are to be closed (that is, electrically turned on) is called sequentially from a character generator 287 in accordance with instructions from host computer 283. This recording data is then outputted to a plurality of latches 291 which store the recording data upon receiving a trigger signal TRG which is also outputted from CPU 281. A flip-flop 294 upon receiving trigger signal TRG enables an oscillator 297. The oscillating signal provided by oscillator 297 serves as a clock signal for a shift register 301. The output of flip-flop 294 is also connected to a flip-flop which serves as a single pulse generator 305 and to one of the two inputs of shift register 302. A single pulse provided by generator 305 based on the output of flip-flop 294 is supplied to the other input of shift register 301. These two inputs of shift register 301 are logically ANDED together. The recording data which is stored in latches 291 is connected to a plurality of heating element drivers 309. Each of the plurality of heating element drivers 309 includes one of the plurality of switches 191. The sequence and timing of which heating element driver is to be activated for closing one of the plurality of switches 191 is dependent upon the outputs of shift register 301. Therefore, by controlling the frequency of the oscillating signal produced by oscillator 297 and the recording data inputted into latches 291, current flow through each heating element 184 can be delayed for a desired time interval to prevent inadvertently heating ink under adjacent nozzles resulting in cross-talk.

Figure 11:
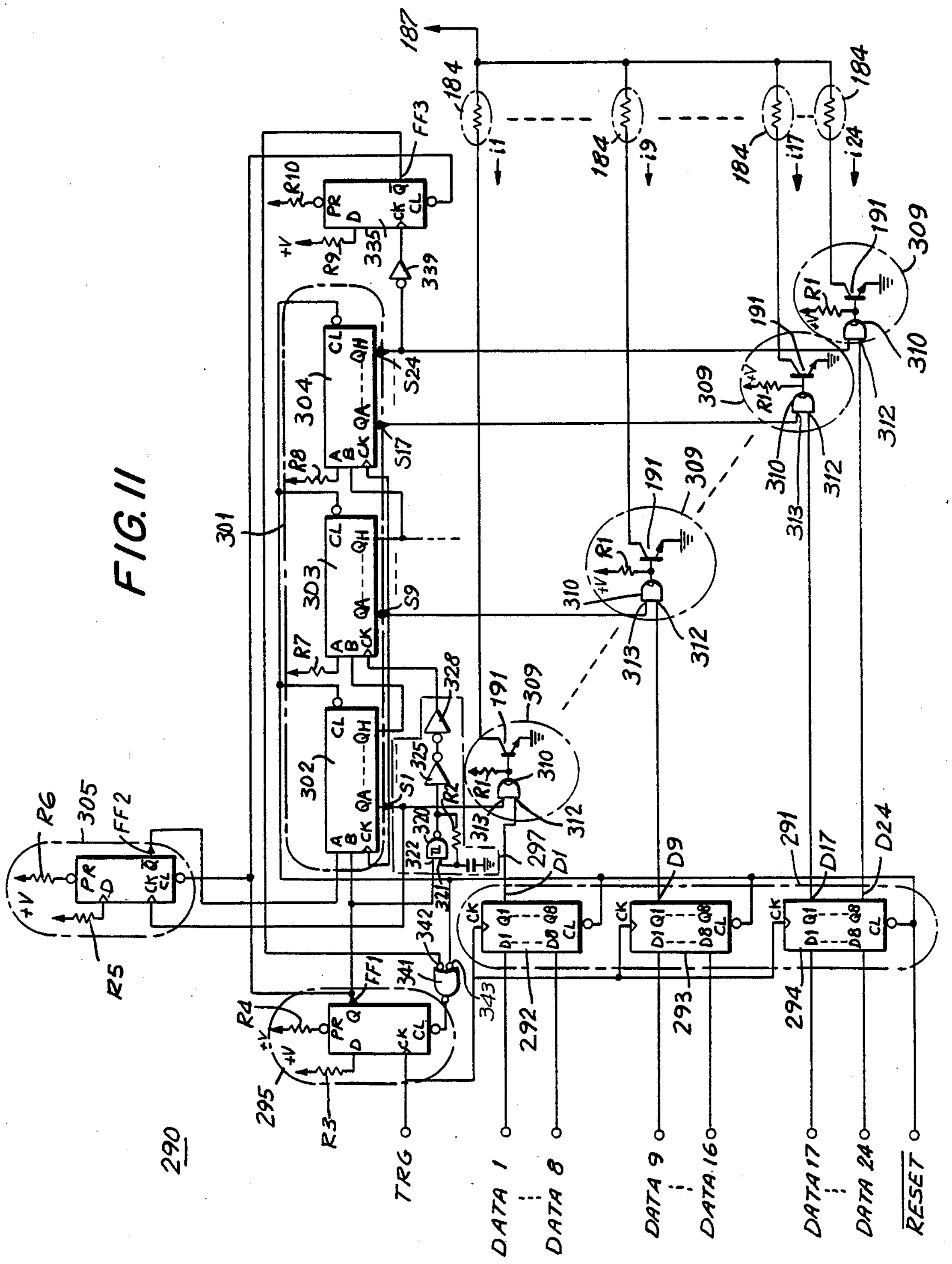
FIG. 11 is an electrical schematic of the time-sharing drive circuit of FIG. 10.

Time-sharing drive circuit 290 is schematically illustrated in FIG. 11 as follows. Latch 291 comprises three 8 bit registers 292, 293 and 294. A suitable register for each latch 292, 293 and 294 is part no. LS273. Flip-flop 294 is a dual flip-flop latch such as but not limited to a quarter package from a part no. LS08. Single pulse generator 305 includes a resistor R5 and a dual flip-flop latch such as, but not limited to, a half package from part no. LS74. Shift register 301 comprises three shift registers 302, 303 and 304 each having a serial input and eight parallel outputs such as part no. LS164. Each heat element driver 309 comprises an open collector transistor which serves as switch 191, an AND gate 310 and a resistor R1. AND gate 310 includes inputs 312 and 313. A suitable AND gate 310 includes a quarter package from a part no. 7409. Oscillator 297 includes a resistor R2, capacitor C1, a Schmidtt trigger NAND gate 320 (such as a quarter package from part no. HC132) and inverters 325 and 328 (such as from two of a six package part no. HC04). NAND gate 320 includes inputs 321 and 322. Additionally, although not specifically identified in FIG. 10, circuit 290 includes a flip-flop 335 similar to flip-flop 294, a NOR gate 341 have inverted inputs 342 and 343 and an inverter 339 similar to the inverters in oscillator 297. A suitable NOR gate is a quarter package from part no. LS08.

Time-sharing driving circuit 290 is electrically connected as follows. The clear input of latches 292, 293 and 294, inverted input 343 or NOR gate 341, and the inverted clear inputs of shift registers 302, 303 and 304 are connected to a Reset terminal. The clock inputs of flip-flop 295 and latches 292, 293 and 294 are connected to a trigger signal TRG terminal. The D input and inverted preset PR inputs of flip-flop 295 are connected to a positive d.c. voltage source through resistors R3 and R4, respectively. Single pulse generator 305 has its D input and inverted preset PR input connected to the positive d.c. voltage source through resistors R5 and R6, respectively. The inverted clear input of single pulse generator 305 is connected to the Q output of flip-flop 295. The Q output of flip-flop 295 is also connected to the B input of shift register 302 and to input 322 of NAND gate 320. The Q output of single pulse generator 305 is connected to the A input of shift register 302. The output of NAND gate 320 is connected to one end of resistor R2 and to the input of inverter 325. The other end of resistor R2 is connected to one end of a capacitor Cl and to input 321 of NAND gate 320. The other end of capacitor Cl is grounded. The output of inverter 325 is connected to the input of inverter 328. The output of inverter 328, which serves as the output for oscillator 297, is connected to each of the clock inputs of shift registers 302, 303 and 304. The $Q_A$ output of shift register 302 is connected to the clock input of single pulse generator 305. The $Q_H$ output of shift register 302 is connected to the B input of shift register 303. Similarly, the $Q_H$ of shift register 303 is connected to the B input of shift register 304. The $Q_H$ output of shift register 304 is connected to the input of inverter 339. The A inputs of shift registers 303 and 304 are connected to the positive d.c. voltage source through resistors R7 and R8, respectively. The output of inverter 339 is connected to the clock input of flip-flop 335. The D input and inverted preset PR input of flip-flop 335 are connected to the positive d.c. voltage source through resistors R9 and R10, respectively. The inverted clear input of flip-flop 335 is connected to the Q output of flip-flop 295. The Q output of flip-flop 335 is connected to inverted input 342 of NOR gate 341. The output of NOR gate 341 is connected to the inverted clock input of flip-flop 295. For each heating element driver 309, the output of AND gate 310 is connected to one end of a pull-up resistor R1 and to the base of transistor 191. The other end of pull-up resistor R1 is connected to a positive d.c. voltage source. The emitter of transistor 191 is grounded and the collector of transistor 191 is connected through one electrode 181 to one end of a corresponding heating element 184. The other end of heating element 184 is connected through one electrode 181 to voltage source 187. For illustrative purposes, only four of the twenty-four heating element drivers 309 corresponding to data lines DATA 1, DATA 9, DATA 17 and DATA 24 are shown in FIG. 11. The twenty-four outputs of shift register 301 (that is, outputs QA–QH of shift register 302, outputs QA–QH of shift register 303 and outputs QA–QH of shift register 304) are connected to corresponding inputs 313 of the twenty-four AND gates 310. Similarly, the twenty-four outputs of latch 291 (that is, $Q_1$–$Q_8$ of latch 292, $Q_1$–$Q_8$ of latch 293 and $Q_1$–$Q_8$ of latch 294 are connected to corresponding inputs 312 of the twenty-four AND gates 310.

Figure 12:
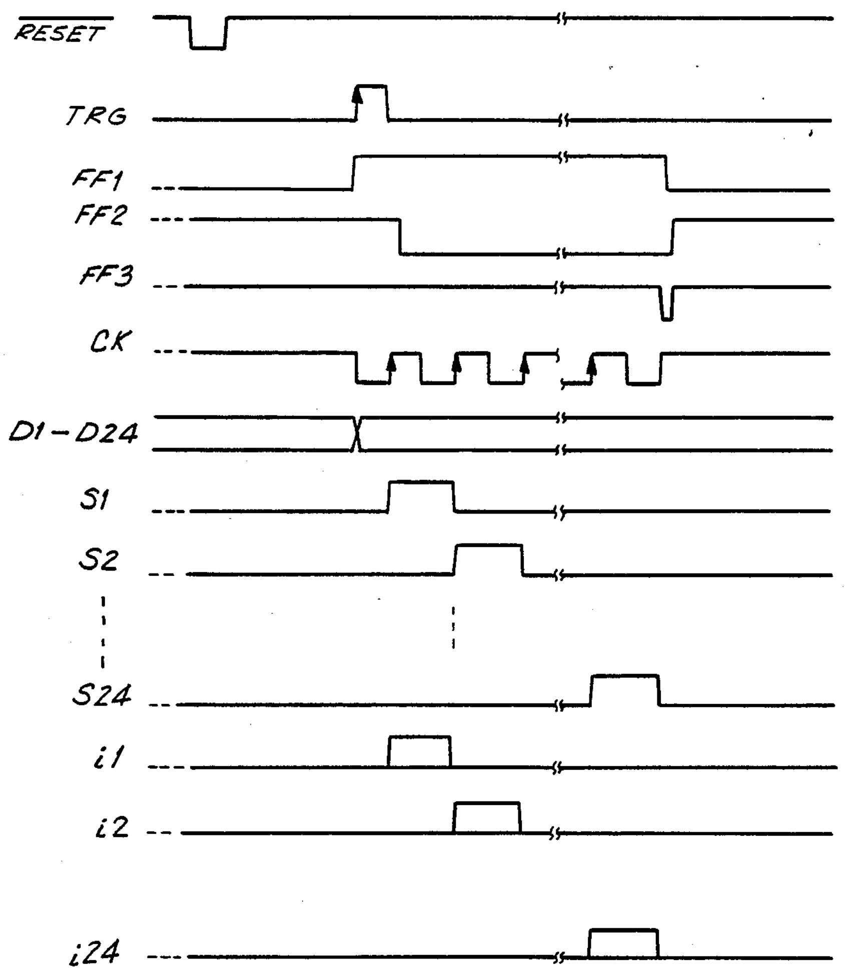
FIG. 12 is a timing diagram illustrating the operation of the time-sharing drive circuit of FIG. 11.

Referring now to FIGS. 11 and 12, operation of time-sharing driving circuit 290 with all recorded data on lines DATA 1–DATA 24 assumed at a high logic level for exemplary purposes only is as follows. Initially, no current flows through any heating elements 184 since the base of each transistor 191 is grounded due to the output of each AND gate 310 being at a low logic level. CPU 281 provides a RESET signal having a low logic level to the inverted clear inputs of latches 292, 293 and 294, inverted input 343 of NOR gate 341 and inverted clear inputs of shift registers 302, 303 and 304. Accordingly, the outputs of latches 292, 293 and 294 and shift registers 302, 303 and 304 are reset to a low logic level. Additionally, inasmuch as the Q output of flip-flop 335 is already at a high logic level, the output of NOR gate 341 is at a low logic level resulting in the inverted clear input of flip-flop 295 resetting the Q output thereof to a logic level of zero. Prior to applying a trigger signal TRG to clock inputs of flip-flop 295 and latches 292, 293 and 294, the Q, Q and Q outputs of flip-flop 295, single pulse generator 305 and flip-flop 335 are at low, high and high logic levels, respectively. A rectangular pulse trigger signal TRG is then provided to the clock inputs of flip-flop 295 and latches 292, 293 and 294. At the same time, the recording data on lines DATA 1–DATA 24 is provided to inputs $D_1$–$D_8$ of latches 292, 293 and 294. These twenty-four data signals represent which of the twenty-four heating elements are to be heated. As previously stated, all twenty-four data signals will be assumed to be at a high logic level. Trigger signal TRG allows each of the data signals to be clocked to the outputs of latches 292, 293 and 294. Additionally, trigger signal TRG clocks the high logic level supplied to D input of flip-flop 295 by the positive voltage source to its Q output represented as signal FF1. With FF1 at a high logic level the clock and preset inputs of single pulse generator 305 are at low logic levels. Thus the Q output single pulse generator 305 (hereinafter referred to as FF2) remains at a high logic level which is supplied to input A of shift register 302. Oscillator 297 provides a high logic level until signal FFl assumes a high logic level. Oscillator 297 then begins to produce an oscillating output represented hereinafter as CK. Signal CK is supplied to each of the clock inputs of shift registers 302, 303 and 304. With both signals FF1 and FF2 at high logic levels which are inputted to the B and A inputs of shift register 302, a high logic level is produced at $Q_A$ output of shift register 302 (which is hereinafter referred to as signal S1). Signal S1 is provided to both the clock input of single pulse generator 305 and input 313 of AND gate 310. Consequently, signal FF2 of single pulse generator 305 assumes a low logic level. Signal S1 and Q1 of latch 292 which are now both at high logic levels result in the output of AND gate 310 assuming a high logic level thereby turning transistor 191 to its conductive state. Accordingly, a current il flows through the corresponding heating element 184 and will continue to flow until signal S1 assumes a low logic level which occurs upon the generation of the next signal CK. More specifically, since the A input of shift register 302 is now at a low logic level, the $Q_A$ output of shift register 302 will assume a low logic level upon seeing the leading edge of the next signal CK. Similarly, as other outputs of shift registers 302, 303 and 304 assume a high logic level, AND gates 310 which are tied to these outputs will assume high logic levels. Corresponding transistors 191 will then be switched to their conductive states resulting in current flow through corresponding heating elements 184. As can be readily appreciated, each of the plurality of heating elements 184 are turned on and turned off based on the frequency of signal CK produced by oscillator 297. Upon the $Q_H$ output of shift register 304 assuming a high logic level, the clock input of flip-flop 335 assumes a low logic level until the next signal CK. At this point in time, $Q_H$ of shift register 304 once again assumes a low logic level resulting in the clock input of flip-flop 335 seeing a leading edge. Therefore, Q output of flip-flop 335 (represented as signal FF3) changes to a low logic level. The output of NOR gate 341 then assumes a low logic level causing flip-flop 295 to be reset (that is, signal FFl reverts to a low logic level). Time-sharing driving circuit 290 is then ready to repeat the foregoing operation.

Figure 13A:
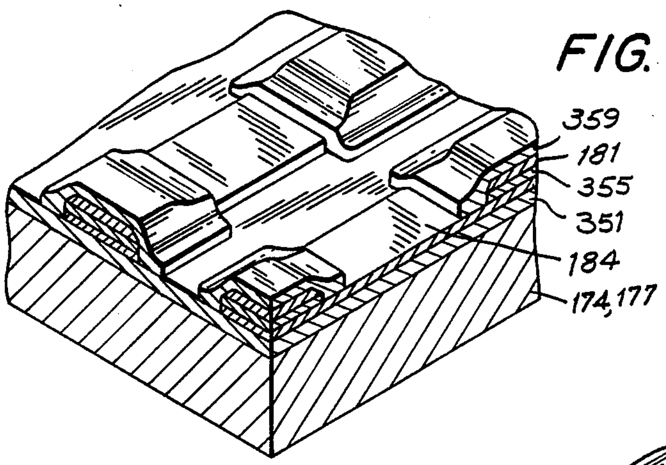
FIGS. 13(*a*), (*b*) and (*c*) and FIGS. 14(*a*) and (*b*) are fragmentary perspective views partially in cross-section of thin film circuits in accordance with alternative embodiments of the invention.
Figure 14A:
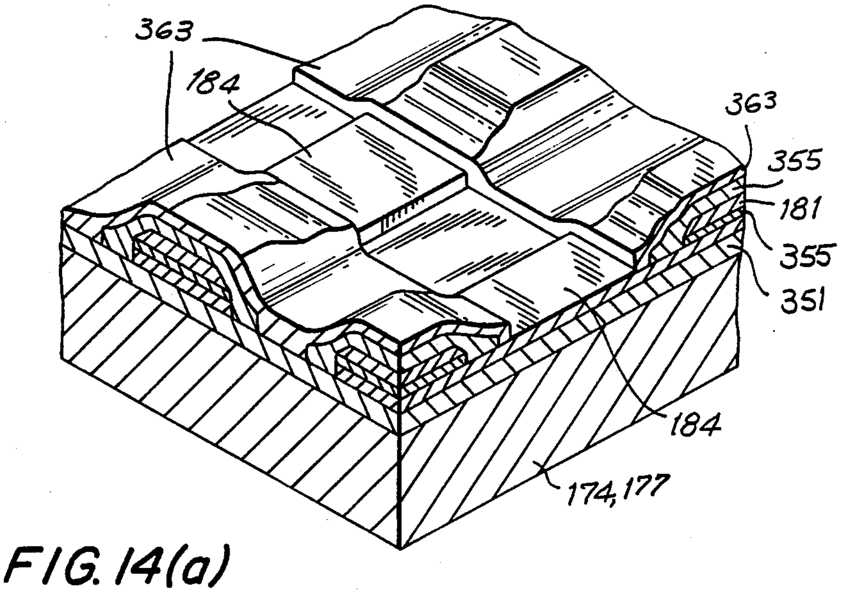

Referring now to FIGS. 13(a), (b) and (c) and FIGS. 14(a) and (b), alternative embodiments in the construction of the thin film circuit comprising electrodes 181 and heating elements 184 on substrates 174 and 177 are illustrated. Substrates 174 and 177 are preferably made from silicon plate, alumina plate and glass plate. In order to provide desirable chemical and thermal resistances, heat generating and heat dissipating properties surrounding the thin film circuitry, a heat regenerating layer 351 made of $SiO_2$ is deposited on substrates 174 and 177 employing a sputtering process. Suitable materials for heating elements 184 include Ta—SiO or Ta—N—$SiO_2$. Additionally, inasmuch as Ta and Ta—N have a high thermal resistance, a low chemical resistance and oxidize easily it is also desirable to add a layer of $SiO_2$ to heating elements 184.

In producing heating elements 184 made of Ta—N—$SiO_2$, Ta particle coated by $SiO_2$ is precalcined and is then sputtered in Ar or in Ar—$N_2$ gas. The ratio between the composition of Ta and $SiO_2$ varies based on the amount of $SiO_2$ which is used for coating Ta. By changing the mixing ratio of N2 to Ar, a thin film having a more stable composition can be obtained.

For purposes of providing a suitable adhesive bond for electrode 181, as shown in FIG. 13(a) an adhesive film 355 such as Ti, Cr, Ni—Cr and the like are the disposed on heating element 184 except for that portion of heating element 184 which is to be in contact with ink 250. Electrode 181 is formed from materials such as Au, Pt, Pd, Al, Cu or the like and has a step portion near heating element 184 for connection to the latter. An adhesive film 355, is disposed on electrode 181 by sputtering. The sputtered material is then selectively etched on electrode 181 to form the predetermined shape. The selective etching typically employs a general photolithography process which is suited for both dry-etching and wet-etching. Inasmuch as film 355 improves the adhesion between electrode 181 and heating element 184, it is not necessary for film 355 to be made of aluminum and the like.

An auxiliary electrode 359 made of Ti is sputtered onto electrode 181 and then selectively etched using photolitography so as to cover electrode 181. Consequently, auxiliary electrode 359 prevents both electrode 181 and film 355 from being eluted electrochemically, serves as a backup electrode and decreases the electrical resistivity of electrode 181 and film 355. Since the conductivity of Ti is low, however, auxiliary electrodes 359 are not a very effective backup for electrodes 181. The foregoing construction is then plasma etched using $CF_4$ gas.

Figure 13B:
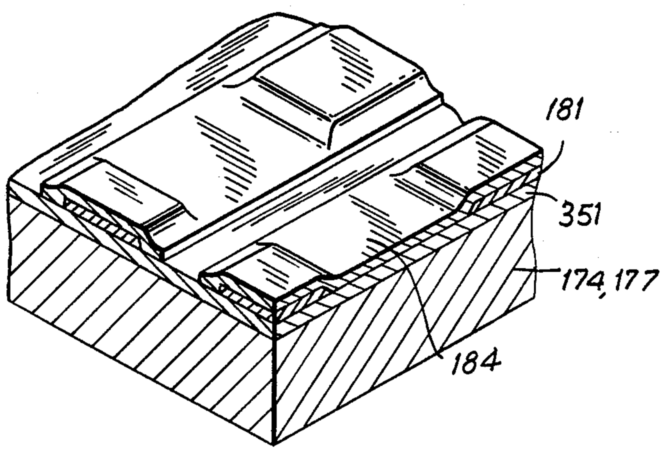
Figure 13C:
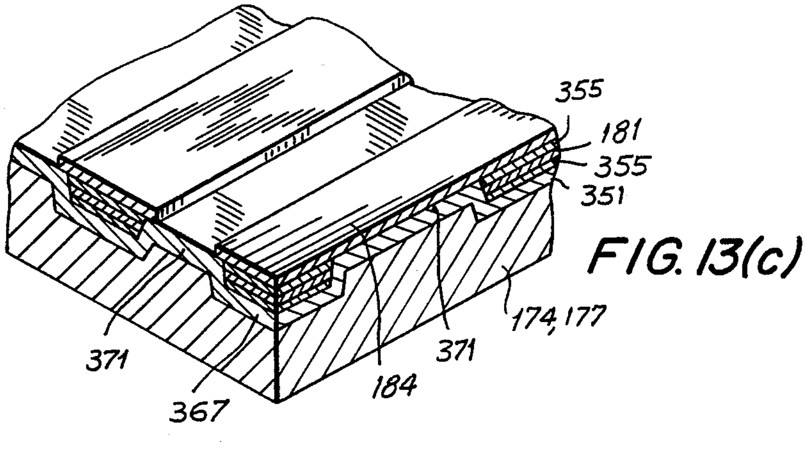

FIGS. 13(b) and 13(c) are constructed in a fashion similar to FIG. 13(a) with the following exceptions. In FIG. 13(b) electrode 181, which has a step portion similar to FIG. 13(a), is disposed directly on top of regenerating layer 351. Additionally, heating element 184 is disposed directly on top of electrode 181 without using an adhesive layer such as film 355. Furthermore, there is no auxiliary electrode 359. In FIG. 13(c) a groove (not shown) is provided on substrates 174 and 177 by photolitography (e.g., dry-etching) with electrode 181 formed thereon. Additionally, regenerating layer 351 rather than having a flat surface as in FIGS. 13(a) and 13(b), has alternating plateaus 371 and flat troughs 367. Furthermore, film 355 is sandwiched between electrodes 181 and regenerating layer 351 as well as between heating element 184 and electrode 181. The additional layer of film 355 between electrode 181 and regenerating layer 351 improves the adhesion therebetween. Still further, and similar to FIG. 13(b), heating element 184 is on top rather than underneath electrode 181. Unlike FIGS. 13(a) and 13(b), however, no cover is provided over electrode 181. This is quite advantageous since from a manufacturing standpoint it is difficult to cover a step portion.

Figure 14B:
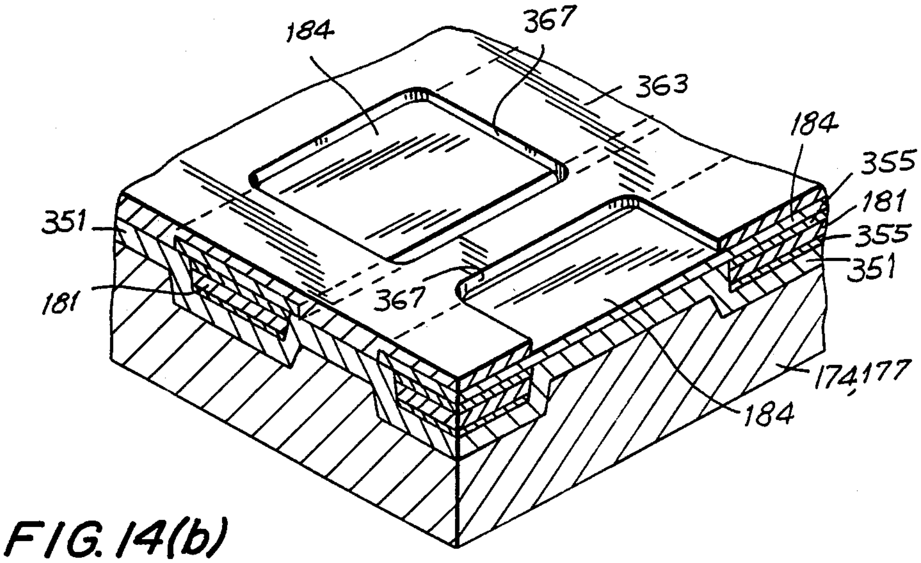

As shown in FIGS. 14(a) and 14(b) in the event that nozzle plate 194 is made from a metallic material, an insulating layer 363 is provided between nozzle plate 194 and the thin film circuitry of heating elements 184 and electrodes 181 to prevent stray current flow through nozzle plate 194. For example, as shown in FIG. 14(a), substrates 174 or 177 are covered by regenerating layer 351 which in turn has disposed thereon heating elements 184. Electrode 181 is sandwiched between film 355. Film 355 is disposed on heating element 184 except for those portions of the latter which are to come into contact with ink 250. Finally, insulating layer 363 is disposed on film 355 so as to cover the latter. As shown in FIG. 14(b), the thin film circuit of FIG. 13(c) is covered by insulating layer 363 having openings 367 to expose those portions of heating element 184 which are to come into contact with ink 250.

Insulating layer 363 is made from a photosensitive resin or other suitable material. In FIGS. 13(a), (b) and (c) and FIGS. 14(a) and (b), heat regenerating layer 351 is about 2–5μm in thickness, film 355 is about 0.05–0.5μm in thickness, electrode 181 is about 0.4–2.0μm in thickness and auxiliary electrode 359 is about 0.05–1.0μm in thickness.

As shown in Table 1 below, thirteen samples of heating elements 184 having different compositions and sputtering conditions were made. Each of these samples had adhesive film 355 made of Cr with a thickness of about 0.4μm, electrodes 181 made of Au with a thickness of 1.5μm, and auxiliary electrode 359 made of Ti with a thickness of 0.5μm. The samples were made using radio frequency (RF) magnetic sputtering apparatus having two polarities and a power of two watts/cm$^2$. The sputtering target was rotated at 10rpm under a temperature of approximately 250° C. The resistivity of each sample was substantially the same by controlling the sputtering time. Heating element 184 was approximately 86μm in width and 172μm in length.

TABLE 1

| No. | $Ta/SiO_2$ composition (weight/mole percent (%)) | Sputtering Pressure Ar(mTor) | Sputtering Pressure N(mTor) |
|---|---|---|---|
| 1 | 50/50 | 5 | 0 |
| 2 | 55/45 | 5 | 0 |
| 3 | 58/42 | 10 | 0 |
| 4 | 60/40 | 5 | 0 |
| 5 | 65/35 | 5 | 0 |
| 6 | 67/33 | 15 | 0 |
| 7 | 70/30 | 5 | 0 |
| 8 | 60/40 | 5 | 0.3 |
| 9 | 60/40 | 5 | 0.07 |
| 10 | 70/30 | 5 | 0.3 |
| 11 | 70/30 | 5 | 0.1 |
| 12 | 80/20 | 5 | 0.2 |
| 13 | 85/15 | 5 | 0.2 |

These thirteen samples of different thin film circuits (heating element 184, electrodes 181 and auxiliary electrodes 359) were then used to construct thirteen recording heads 105 as shown in FIG. 4 with recording heat 105 having twenty-four nozzles 207. Each of the thirteen heating elements 184 generated $4.0\times10^{8}$w/m$^{2}$ based on a driving pulse width of 6μsec and a driving frequency of 2KHBz applied to electrodes 181. Ink 250 had the following composition:

| | |
|---|---|
| Solvent - Diethlene glycol | 55 wt. % |
| Water | 40 wt. % |
| Dye - C.I. Direct Black 154 | 5 wt. % |

The corresponding test results are shown in Table 2 wherein the "resistivity" of heating element 184 is based on a resistance of approximately 50Ω and wherein "life" is defined as the total number of dots/droplets of ink which are produced by recording head 105 until the resistance of heating element 184 changes by at least 20%.

TABLE 2

| No. | resistivity (μΩ/cm) | thickness (μm) | life (Dot) |
|---|---|---|---|
| 1 | 6400 | 2.6 | $\sim3\times10^{6}$ |
| 2 | 4400 | 1.8 | $\sim8\times10^{7}$ |
| 3 | 2900 | 1.1 | $\sim8\times10^{8}$ |
| 4 | 2100 | 0.84 | $\sim7\times10^{8}$ |
| 5 | 1200 | 0.50 | $\sim6\times10^{8}$ |
| 6 | 930 | 0.38 | $\sim3\times10^{8}$ |
| 7 | 700 | 0.28 | $\sim9\times10^{7}$ |
| 8 | 7800 | 3.1 | $\sim2\times10^{6}$ |
| 9 | 1900 | 0.78 | $>1\times10^{9}$ |
| 10 | 4500 | 1.8 | $>1\times10^{9}$ |
| 11 | 1200 | 0.51 | $>1\times10^{9}$ |
| 12 | 2900 | 1.2 | $\sim8\times10^{8}$ |
| 13 | 2000 | 0.81 | $\sim6\times10^{6}$ |

As can be appreciated by the results found in Tables 1 and 2, when a mole percent of Ta in the Ta—$SiO_2$ is between 58–65%, a life of at least 5×108 can be expected. Additionally, when a mole percent of Ta in Ta—N—$SiO_2$ is between 60–80%, a life of at least 7×108 dots can be expected. Consequently, a thickness of approximately 0.5–1.8μm for heating element 184 is desirable. Still further, no scorching of the thin film circuit comprising electrodes 181, auxiliary electrodes 359 and heating elements 184 was found. There was also no erosion nor elution of electrodes 181. It has been further found that the life of the thin film circuits described in connection with FIGS. 13(*a*), (*b*) and (*c*) did not vary significantly from each other. All the foregoing was obtained without the use of a conventional protective layer as required in the prior art. Another significant advantage over the prior art was that the energy needed for heating heating elements 184 for each life set forth in Table 2 was reduced by 30% due, in part, to no longer needing a conventional protective layer covering the thin film circuitry.

By not providing a protective layer covering that portion of heating element 184 which comes into contact with ink 250, however, cavitation damage to heating element 184 can occur. More particularly, cavitation damage which refers to the cracking of heating element 184 is shown in its initial stages in FIG. 15(*a*) and in its advanced stages in FIG. 15(*b*) and is denoted by reference numeral 371. As shown in FIGS. 16(*a*)–(*e*), cavitation damage occurs due to the expansion and then rapid contraction of one or more air bubbles 375. As shown in FIG. 16(*a*), approximately 10μsec after current begins to flow through heating element 184, air bubble 375 begins to expand resulting in the ejection of ink through nozzle 207 as shown in FIG. 16(*b*). Thereafter, current flow through heating element 184 ceases due to switch 191 opening, that is, due to the corresponding output of shift register 301 assuming a low logic level. Accordingly, air bubble 375 begins to contract as shown in FIG. 16(*c*). Air bubble 375 continues to rapidly contract as shown in FIG. 16(*d*) and substantially collapses within 10–20μsec after contraction begins. As shown in FIG. 16(*e*), such sudden and rapid contraction of air bubble 375 results in the generation of concentrated shock waves represented by arrows K which are directed toward and strike the center of heating element 184. The repeated expansion and contraction of air bubbles 375 over a period of time results in the cavitation damage shown in FIG. 15(*b*). In the thirteen samples of recording head 105 shown in Table 2, a life of $7\times10^{8}$ dots or greater was achieved even with such cavitation damage.

Nevertheless, in order to improve the life of recording head 105, four different methods for substantially reducing, if not eliminating, cavitation damage can be employed as follows.

Since air bubbles 375 collapse toward the center of heating element 184, the first method, as shown in FIGS. 17(*a*)–(*d*) provides an opening in the center of heating element 184. This opening allows the collapsing air bubbles and associated concentrated shock waves K to pass through heating element 184 without affecting the life of heating element 184 as quickly. For example, as shown in FIG. 17(*a*) a somewhat elongated donut-shape heating element 184 is employed. In FIG. 17(*b*) a zigzag S-shaped heating element 184 having no portion thereof at its geometric center. FIG. 17(*c*) employs a C-shaped heating element 184. As shown in FIG. 17(*d*) a somewhat elongated donut-shaped heating element 184 similar to FIG. 17(*a*) is used; the only difference being that one of the distal ends of auxiliary electrode 359 has a C-shaped tail surrounding heating element 184.

Testing of heating elements 184 as shown in FIGS. 17(*a*)–(*d*), which were formed based on Sample No. 4 of Tables 1 and 2, resulted in increasing the life of heating element 184 from $7\times10^{8}$ dots to $1\times10^{9}$ dots. Furthermore, such increase in life was repeated whether or not the ink ejecting direction was varied by an angle ±30° relative to the top surface of upper step portion 201 of nozzle plate 194.

Figure 15A:
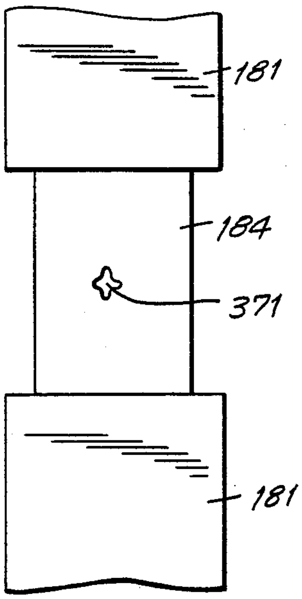
FIGS. 15(*a*) and (*b*) are fragmentary top plan views of a damaged heating element.
Figure 15B:
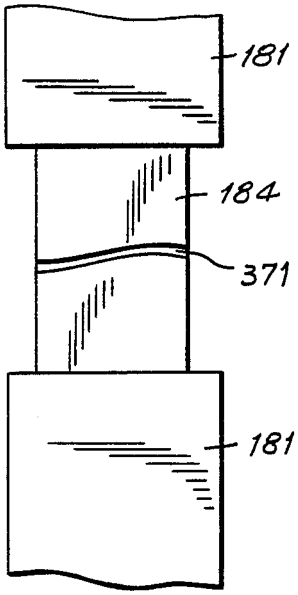
Figure 16C:
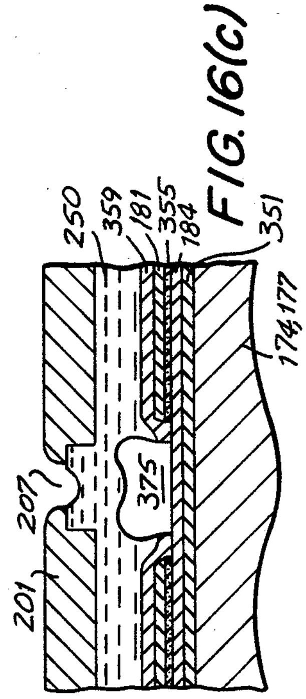
FIGS. 16(*a*), (*b*), (*c*), (*d*) and (*e*) are fragmentary, side elevational views in cross-section of heating elements underneath nozzles during expansion and contraction of air bubbles.
Figure 16D:
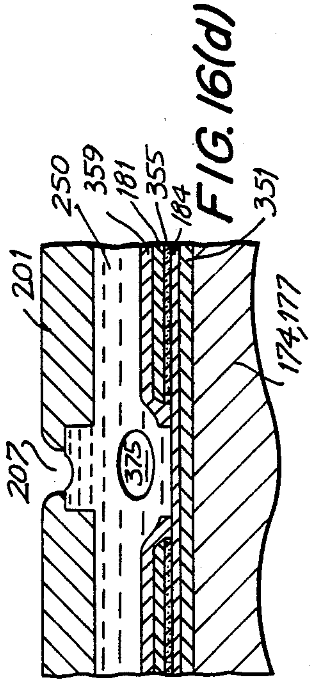
Figure 16E:
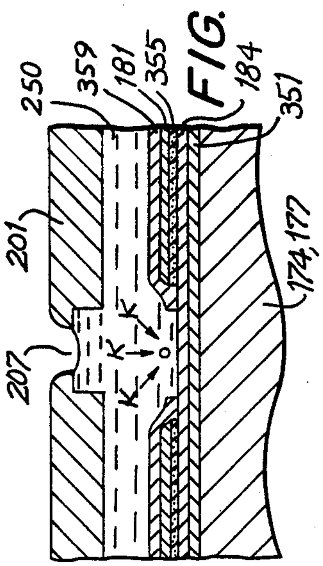
Figure 16A:
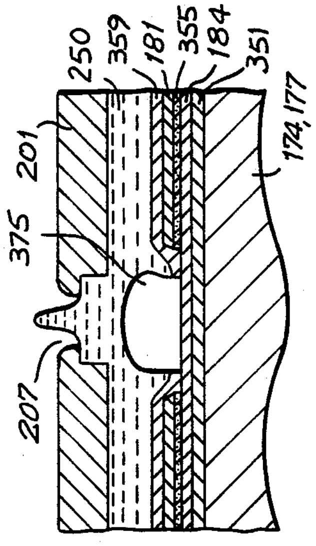
Figure 16B:
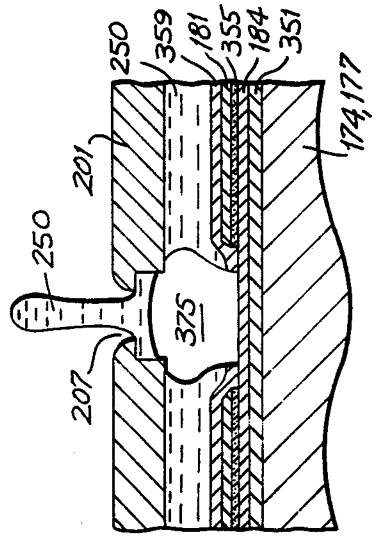
Figure 17A:
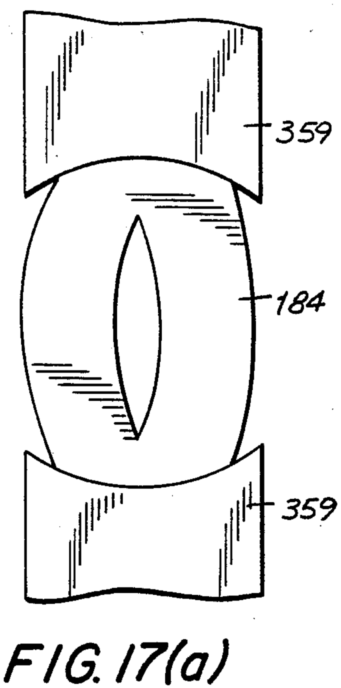
FIGS. 17(*a*), (*b*), (*c*) and (*d*) and FIGS. 18(*a*), (*b*) and (*c*) are fragmentary top plan views of heating elements in accordance with additional alternative embodiments of the invention.
Figure 17B:
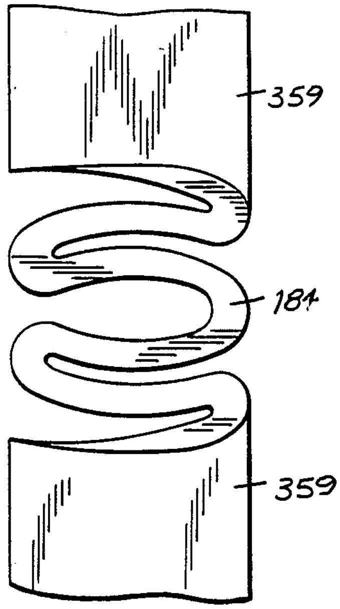
Figure 17C:
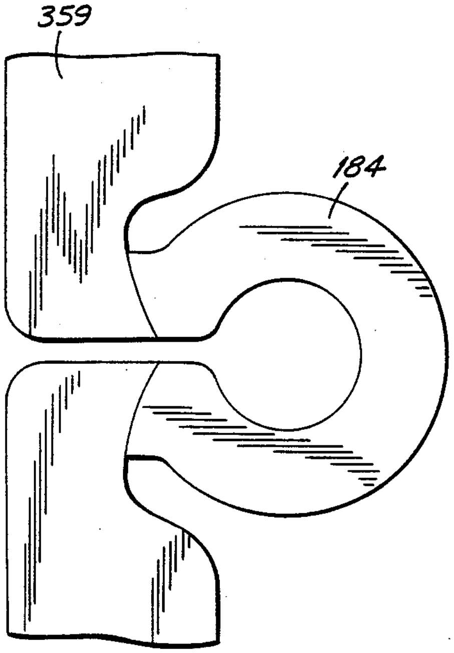
Figure 17D:
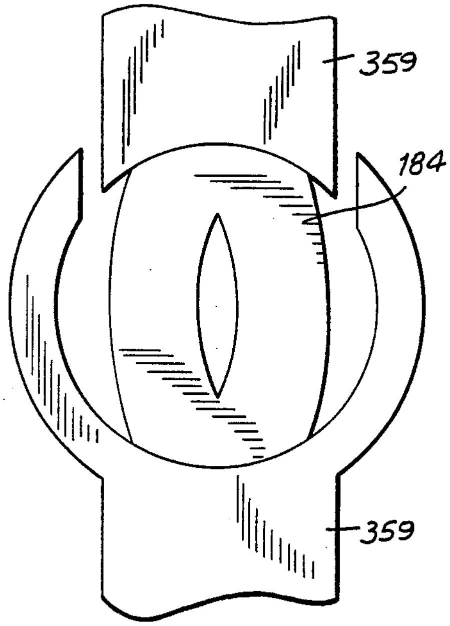
Figure 18A:
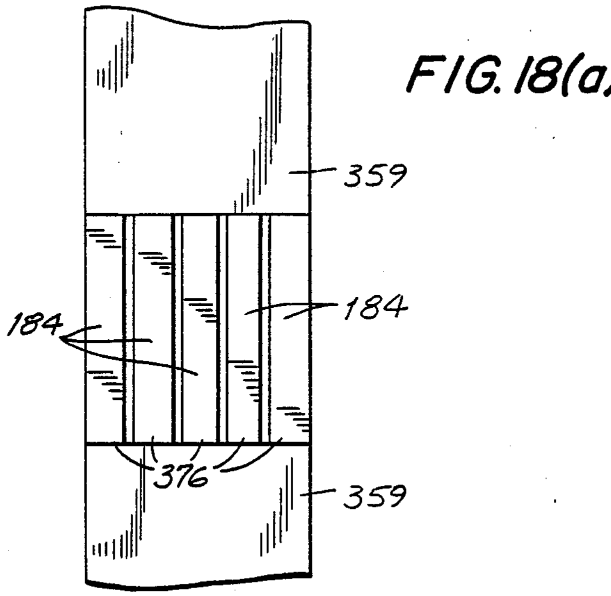
Figure 18B:
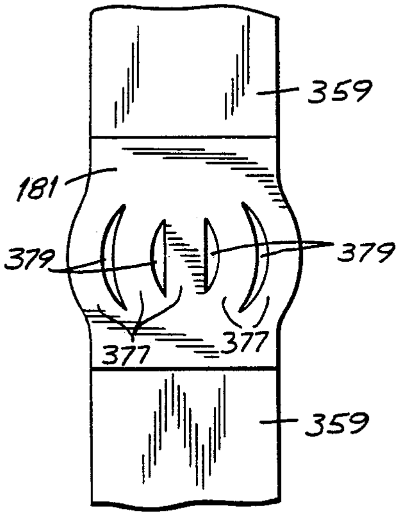
Figure 18C:
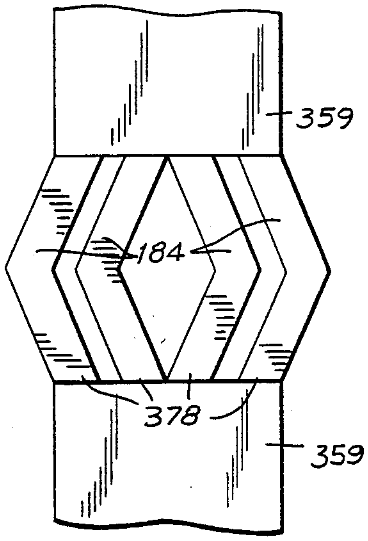
Figure 19A:
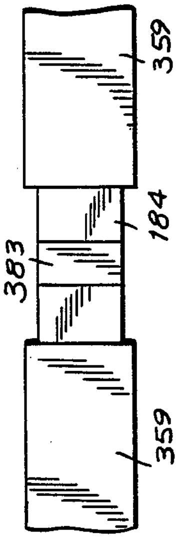
FIGS. 19(*a*), (*b*), (*c*), (*d*) and (*e*) are fragmentary top plan views of heating elements in accordance with other alternative embodiments of the invention and FIGS. 19(*f*), (*g*) and (*h*) are fragmentary side elevational views in cross-section of thin film circuitry illustrating the heating element of FIGS. 19(*a*), (*b*) and (*e*)
Figure 19B:
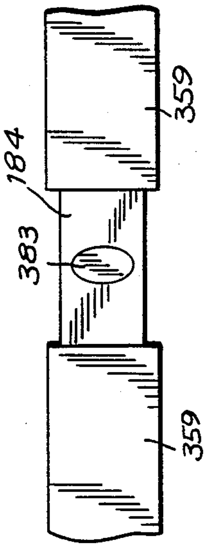
Figure 19C:
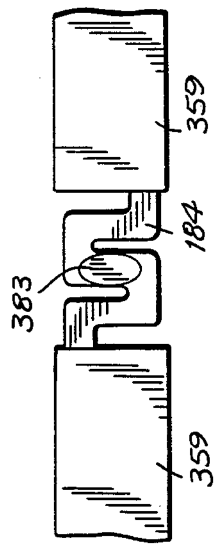
Figure 19D:
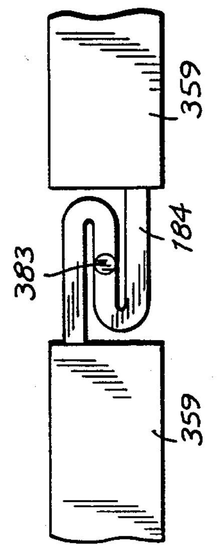
Figure 19E:
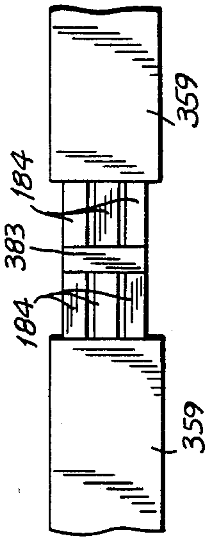
Figure 19F:
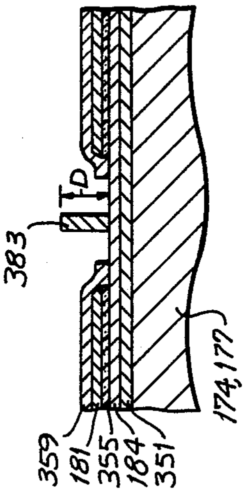
Figure 19G:
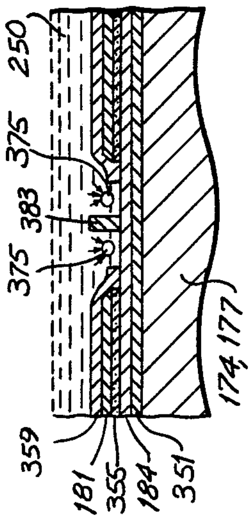
Figure 19H:
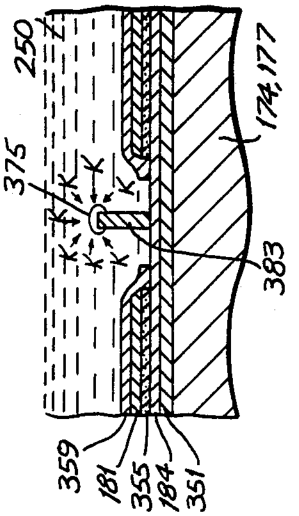

A second method for improving life by minimizing cavitation damage to heating element 184 is shown in FIGS. 18(*a*)–(*c*). In the second method, heating element 184 was partially or completely subdivided so that current flow through heating element 184 travelled along parallel paths. In FIG. 18(*a*), heating element 184 was divided into five strips 376 extending between auxiliary electrodes 359. Each of strips 376 has substantially the same surface area so that the current flow through each strip is about the same. In FIG. 18(*b*) four slivers 379 of heating element 184 are removed creating five strips 377 for current to flow through. In order for the surface area of each strip 377 to be about the same, the central portion of 184 bulges outwardly slightly thereby ensuring that the current flow through each strip 377 is about the same. In FIG. 18(*c*), four substantially V-shaped strips 378 of heating element 184 were formed between auxiliary electrodes 359. Each strip 378 also has substantially the same surface area. Tests performed using heating elements 184 as shown in FIGS. 18(*a*)–(*c*) similar to the tests performed using heating elements shown in FIGS. 17(*a*)-(*d*) resulted in the same increase in life expectancy of at least approximately $1\times10^9$ dots. By providing such parallel paths for current to flow through heating element 184, cavitation damage was substantially limited to those strips 376, 377 or 378 near the geometric center of heating element 184. Consequently, advanced stages of cracking as shown in FIG. 15(*b*) were substantially eliminated resulting in a more reliable and durable recording head 105.

A third method of substantially eliminating cavitation damage of heating element 184 is shown in FIGS. 19(*a*)-(*h*). In this third method, a film 383 having a thickness (represented by D shown in FIG. 19(*f*)) of at least 5μm was disposed about the center of heating element 184 so that any collapsing air bubbles 375 and corresponding concentrated shock waves would impinge upon film 383. Film 383 can be formed from such materials as Ta, Ti, Au, Pt, Cr and the like or insulating materials such as $SiO_2$, $Ta_2O_5$, photosensitive resin and the like. For purposes of durability, however, Ti, Au and $SiO_2$ are best suited to be used to form film 383. Preferably, film 383 is made by a plating or photolithography method at the time that electrodes 181 and heating element 184 are formed on substrates 174 and 177.

In FIG. 19(*a*), film 383 is substantially a rectangular block rising above heating element 184. FIG. 19(*b*) illustrates film 383 as a substantially oval block rising above heating element 184. FIG. 19(*c*) shows film 383 as a substantially oval block similar to FIG. 19(*b*) but with heating element 184 following first a U-shaped and then inverted U-shaped path between auxiliary electrodes 359. In FIG. 19(*d*), film 383 has a substantially cylindrical shape rising above heating element 184 wherein heating element 184 has a substantially Z-shaped configuration. In FIG. 19(*e*), film 383 has a substantially rectangular block shape similar to FIG. 19(*a*) with heating element 184 divided into strips similar to FIG. 18(*a*). FIG. 19(*f*) is a fragmentary side elevational view in cross-section of that portion of recording head 105 centered about film 383 in accordance with the embodiments of FIGS. 19(*a*), (*b*) and (*e*). As shown in FIG. 19(*g*) when thickness D of film 383 is less than 5μm, air bubbles normally collapse on heating element 184 rather than film 383 and therefore do not increase the life/durability of the heating element 184. In other words, when thickness D of film 383 is less than 5μm, the extent of cavitation damage to heating element 184 is not lessened. In contrast thereto, as shown in FIG. 19(*h*) when thickness D of film 383 is 5μm or greater, air bubble 375 generally collapses on film 383 thus significantly improving the life of recording head 105. In tests conducted similar to those previously described for FIGS. 17(*a*)-(*d*), a life of at least $1\times10^9$ dots was obtained by using the various embodiments shown in FIGS. 19(*a*)-(*e*).

A fourth method for substantially reducing cavitation damage to heating element 184 is shown in FIGS. 20(*a*) and (*b*). More particularly, by maintaining the ink temperature at approximately 70° C. or greater while air bubble 375 is collapsing, the time for air bubble 375 to collapse is significantly increased by a factor of approximately two times compared to the time taken for air bubble 375 to collapse when ink 250 is exposed to ambient/room temperature. By extending the time for air bubble 375 to collapse, the shock waves K produced by the sudden and rapid contraction of air bubbles 375 are significantly lessened. Consequently, the life/durability of recording head 105 can be significantly increased. A recording head 105' incorporating this fourth method as shown in FIG. 20(*a*). Recording head 105' includes a heating apparatus 387 disposed below plate 151 and on lower step portion 197. A temperature sensor 391 is disposed in base 164 so as to be in contact with that portion of ink 250 within reservoir 167. Alternatively, as shown in FIG. 20(*b*), heating apparatus 387 may be within base 164 with temperature sensor 371 extending through nozzle plate 194 near air vent 204. There are, of course, a number of other positions for heating apparatus 387 and temperature sensor 391 about recording head 105.

Referring once again to FIG. 10, operation of a temperature control circuit 386 embracing this fourth method is shown. More particularly, temperature sensor 391 continuously monitors the temperature of ink 250 and provides an output signal to a non-inverting input of a comparator 395. An inverting input of comparator 395 is connected between a variable resistance Vr and a fixed resistence R13. The end of resistor Vr not connected to resistor R13 is connected to a positive d.c. voltage source. The end of resistor R13 not connected to resistor Vr is connected to ground. Accordingly, the voltage applied to the inverting input of comparator 395 can be varied to correspond with a desired threshold temperature which will turn on heating apparatus 387. The output of comparator 395 is supplied to a buffer Buf whose output is connected to the base of a transistor Tr. The emitter of Tr is grounded and the collector of Tr is connected to heating apparatus 387. Heating apparatus 387 is powered by the positive d.c. voltage source. Accordingly, when the signal produced by temperature sensor 391 is greater than the voltage supplied to the inverting input of comparator 395, an output signal will be produced by comparator 395 and stored in buffer BUF which will switch transistor Tr to its conductive state and thus turn on heating apparatus 387. When the temperature of ink 250 is at or above the predetermined level, however, the signal produced by temperature sensor 391 will no longer be greater than the voltage applied to the inverting input of comparator 395. Consequently, the output signal from comparator 395 will be insufficient to maintain transistor Tr in its conductive state. Accordingly, heating apparatus 387 will be turned off and will not be turned on again until the temperature of ink 250 is sufficient to cause temperature sensor 391 to produce a voltage greater than the voltage supplied to the inverting input of comparator 395. A general thermistor can be used for temperature sensor 391 and a sheathed heater or a positive temperature coefficient (PTC) thermistor can be used for heating apparatus 387. Inasmuch as a PTC thermistor includes a self-temperature control unit which is particularly applicable when a particular temperature is to be maintained, temperature control circuit 386 can be reduced to simply a PTC thermistor as heating apparatus 387.

A recording head 105' prepared in accordance with sample 4 of Tables 1 and 2 using for temperature sensor 391 a general thermistor and for heating apparatus 387 a PTC thermistor having a resistence of 80Ω at ambient temperature and a Curie point of 100° C. was tested maintaining temperatures varying from room temperature through 90° C. The results of these tests are shown in Table 3.

TABLE 3

| Ink temperature | Life (Dots) |
|---|---|
| room temperature | $\sim 7 \times 10^8$ |
| 40° C. | $\sim 7 \times 10^8$ |
| 50 | $\sim 7 \times 10^8$ |
| 60 | $\sim 7.8 \times 10^8$ |
| 70 | $\sim 1 \times 10^9$ |
| 80 | $\sim 1.2 \times 10^9$ |
| 90 | $\sim 1.6 \times 10^9$ |

As can be readily appreciated, when an ink temperature of 70° C. or greater was maintained, a life of at least $1 \times 10^9$ dots was obtained. Furthermore, when the ink temperature was maintained at at least 80° C. no observable cavitation damage was observed and very little cavitation damage was observed by maintaining the ink temperature at at least 70° C. The foregoing four methods of minimizing cavitation damage to heating element 184 also can be used to increase the life, durability and reliability for conventional thermal ink jet recording heads such as those shown in FIGS. 1 and 2.

Figure 22:
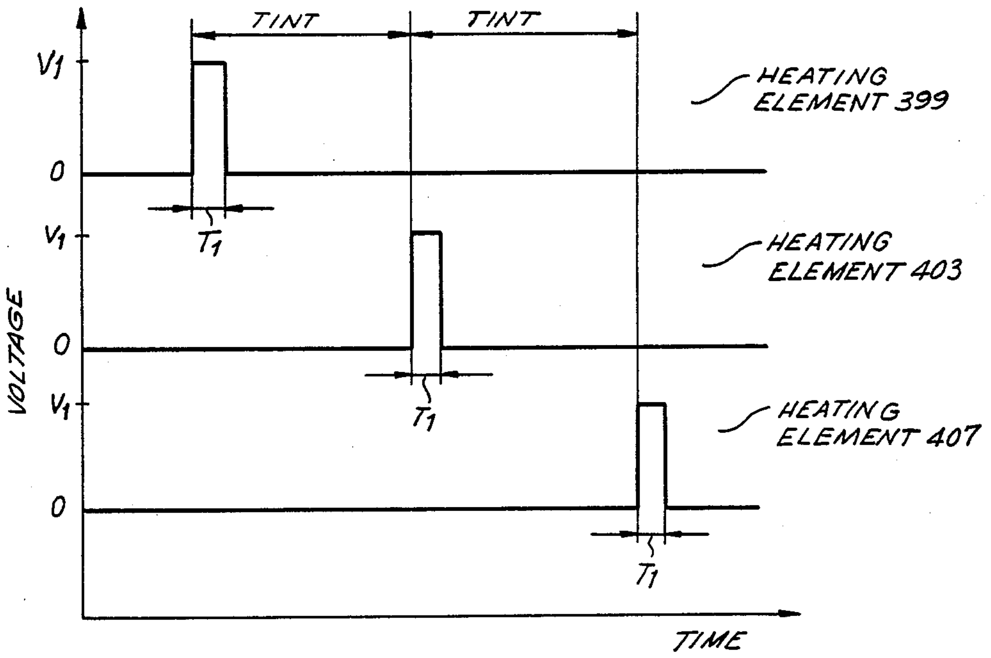
FIG. 22 is a timing diagram illustrating the voltages applied to the heating elements of FIG. 21.

In accordance with an object of the invention, no barriers 71 as in FIGS. 1 and 2 to prevent cross-talk have been employed. Instead, each of the plurality of heating elements 184 is intermittently energized with a sufficient time delay between energization of adjacent heating elements 184 to prevent cross-talk. These timing delays are described with reference to FIGS. 21, 22 and 23 in which adjacent heating elements are represented by reference numerals 399, 403 and 407. A rectangular pulse from voltage source 187 having an amplitude $V_1$ and a pulse width of $T_1$ is applied to heating elements 399, 403 and 407 sequentially. The firing of each of these voltage pulses $V_1$ is delayed relative to adjacent heating elements 399, 403 and 407 as indicated by time interval Tint in FIG. 22. Time interval Tint is defined as either the time interval between the leading edge of the rectangular pulse applied to heating element 399 and the leading edge of the rectangular pulse applied to heating element 403 or as the time interval between the leading edge of the rectangular pulse applied to heating element 403 and the leading edge of the rectangular pulse applied to heating element 407.

Figure 23:
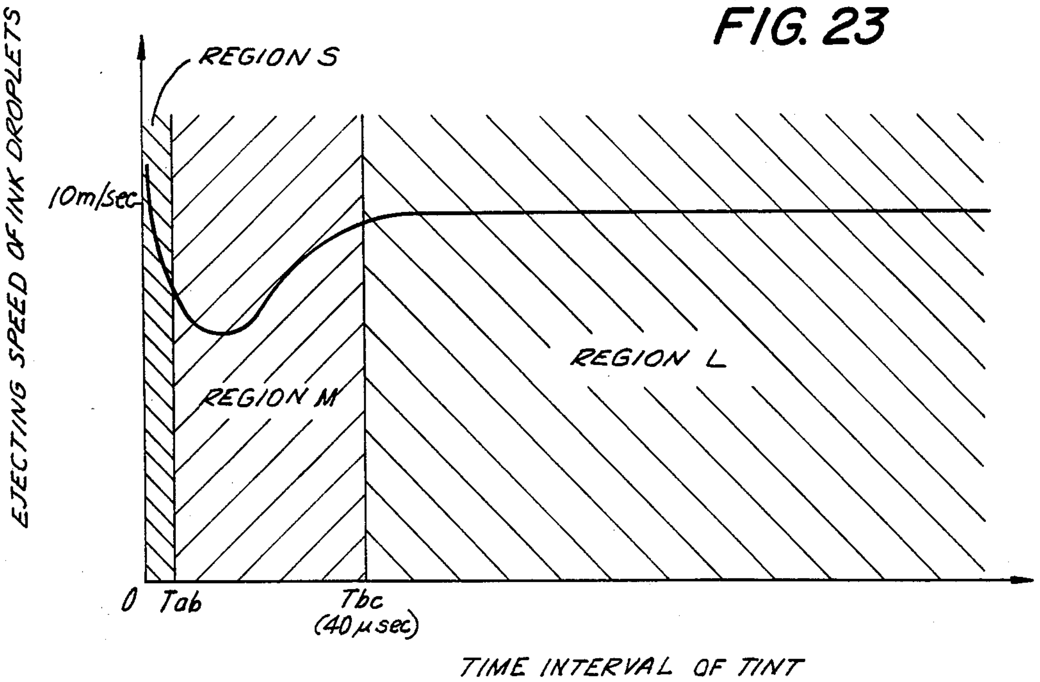
FIG. 23 is a graph of the ejecting speed of ink droplets versus time interval of Tint of FIG. 22.

Three recording heads 105 prepared in accordance with Sample 9 of Table 1 had a pitch P between adjacent nozzles of 106μm, 202μm, and 317μm, respectively. The heating area of heating element 105 had a width of 80μm and a length of 160μm. The power/surface area under which heating element 105 was operated was $4.0 \times 10^8 W/m^2$. The applied voltage produced by voltage source 187 had a frequency of approximately 2 KHz with rectangular pulse width $T_1$ of 6μsec. Results of testing these three recording heads in accordance with the above conditions is shown in FIG. 23 wherein the ejection speed of the ink droplets through nozzle plate 194 was affected by only time interval Tint and not by pitch P. As shown in FIG. 23, when the time interval of Tint was less than Tab, represented by region S, the ejecting speed of the ink droplets was high and relatively stable, however, the ink droplets were swollen due to cross-talk from adjacent nozzles 207. Time interval Tab is about 4–8μs. When the time interval of Tint was between Tab and Tbc, represented by region M, the ink droplets were not ejected stably and the ejection speed of the ink droplets was reduced compared to region S. Time interval Tbc is about 30–40μsec. When the time interval of Tint, however, was greater than Tbc, represented as region L, the ink droplets were ejected stably and had a high ejecting speed with no cross-talk occurring. More particularly, the ejecting speed of the ink droplets in region L was approximately 10m/sec with time interval Tbc equal to approximately 40μs. The invention is also far superior to a Japanese Laid-Open Patent No. 59-71869 in that the invention is not dependent upon pitch P between heating elements 184 which as disclosed in this Japanese patent requires a pitch P of approximately 130μm and exhibited the characteristics of region 5. Furthermore, the invention in contrast to this Japanese patent with a time interval Tint of 40μsec or greater provides a higher density and a higher picture quality ink jet recording.

Figure 24A:
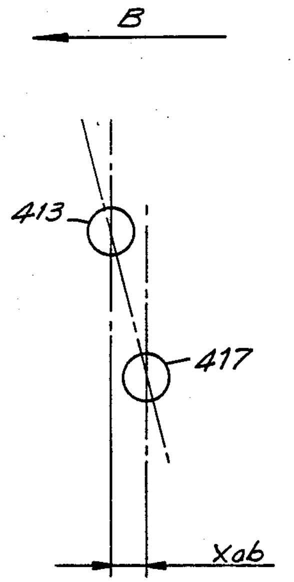
FIG. 24(*a*) is a diagrammatic top plan view of two nozzles of the recording head shown in FIG. 4 and FIG. 24(*b*) is a timing diagram of the voltages applied to the two nozzles of FIG. 24(*a*)
Figure 24B:
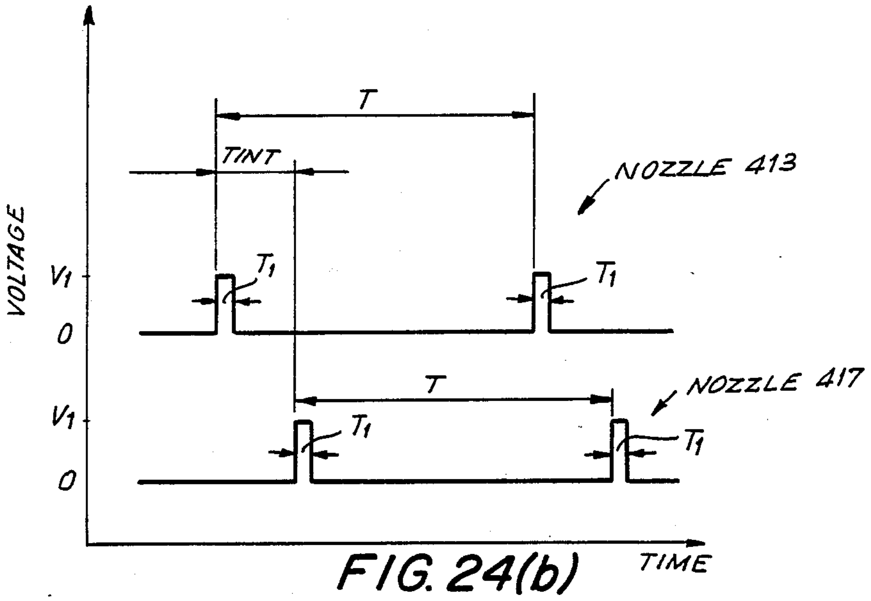

FIGS. 24(*a*) and (*b*) address the potential problem of slippage, that is, of recording information on a recording medium beyond the point where the information is supposed to be printed. More particularly, in order to compensate for potential slippage due to time interval Tint, adjacent nozzles such as nozzles 413 and 417 of FIG. 24(*a*) are separated by a distance Xab. Distance Xab is measured from the center line of nozzle 413 to the center line of nozzle 417 in the direction B (i.e., the direction that recording head 105 travels). Each of the center lines is normal to direction B. Distance Xab can be calculated as follows:

$$Xab = DP\,(Tint/T + J)$$

wherein J is an integer and DP represents the distance that recording head 105 travels in a direction B during a minimum driving period T. The parameters Tint, T and $T_1$ (which is the pulse width of the rectangular pulse applied to nozzles 413 and 417) are illustrated in FIG. 24(*b*). Xab is preferably less than 1/5 of DP and desirably less than 1/10 of DP to result in no observable slippage.

Figure 25:
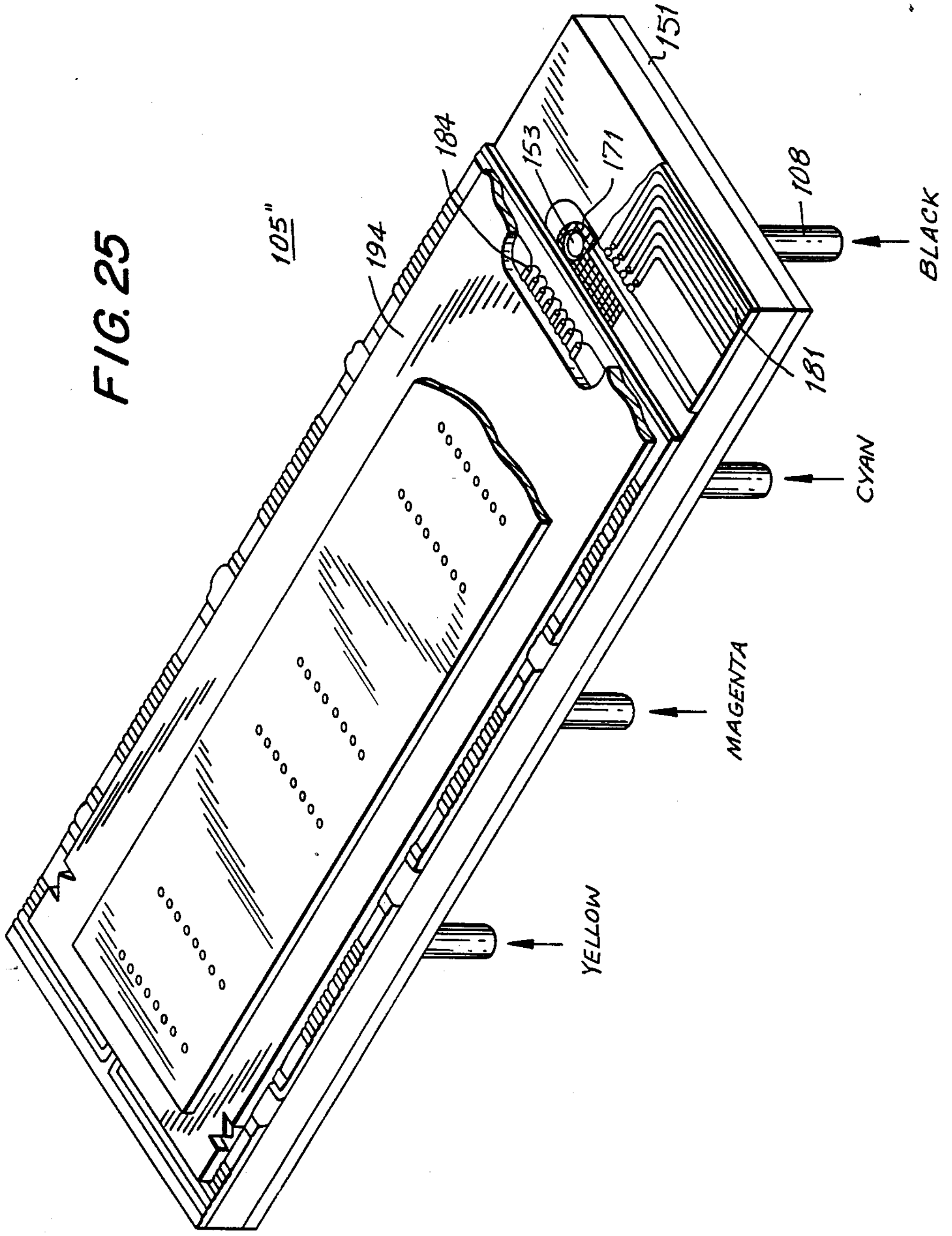
FIG. 25 is a perspective view partially in cross-section of a multicolored recording head in accordance with another alternative embodiment of the invention.

FIG. 25 illustrates an alternative embodiment of the invention providing a multicolored ink jet recording head 105" in which all colors, namely, yellow, magenta, cyan and black are provided on a plate 151. In contrast thereto, prior art color ink jet recording heads have had great difficulty in regulating a high density of colored inks. Recording head 105" employs the same basic methods of construction as defined heretofore for each colored ink. Additionally, rather than employing one nozzle plate 194 a plurality of nozzle plates for each of the different colors can be used.

Figure 26:
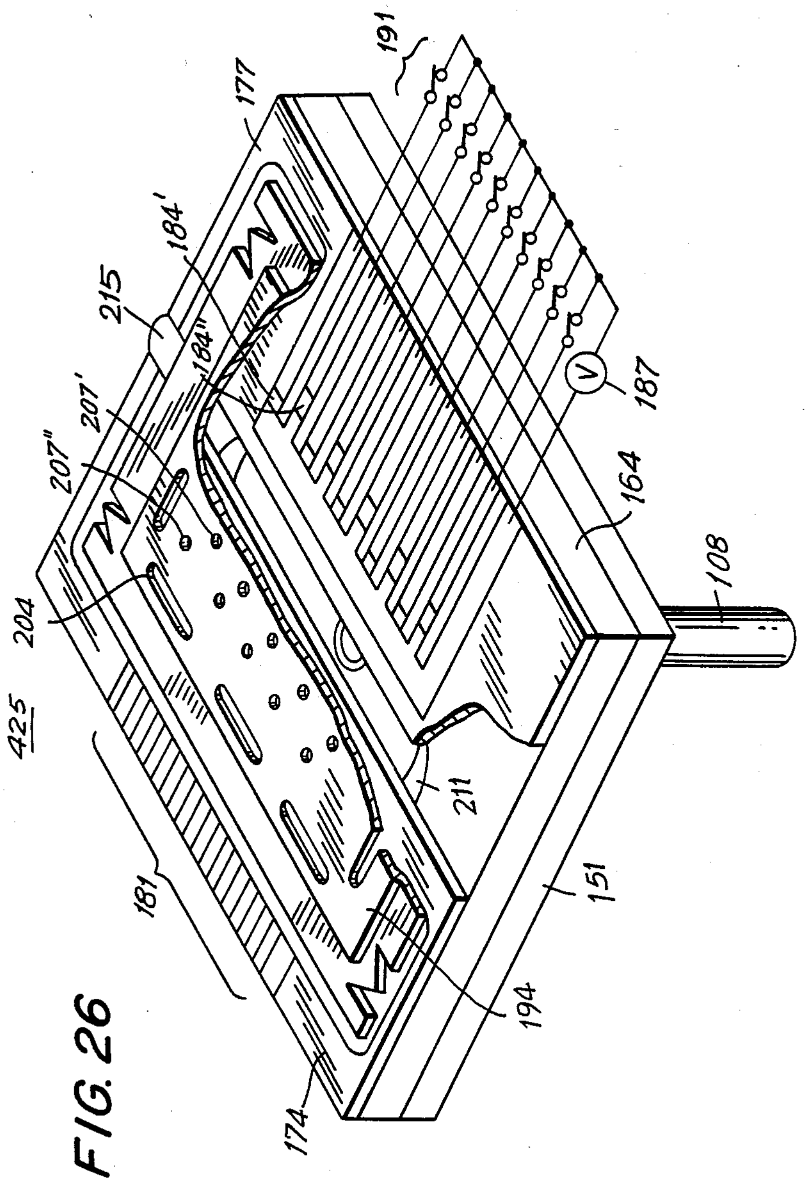
FIGS. 26 and 27 are perspective views partially in crosssection of additional alternative embodiments in accordance with the invention.
Figure 27:
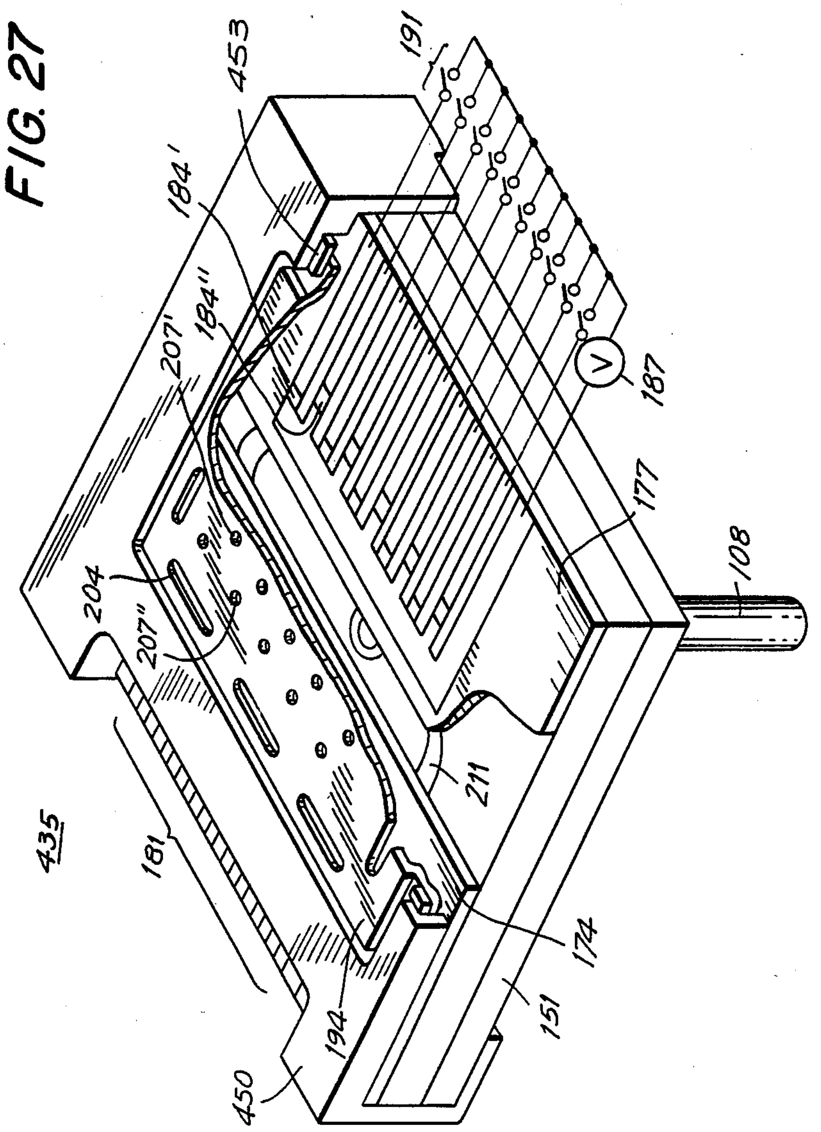

In two other alternate embodiments, as shown in FIGS. 26 and 27, respectively, a recording head 425 and 435 each contain two rows of heating elements 184' and 184" and corresponding rows of nozzles 207' and 207" on each of the substrates 174 and 177. These two rows of heating elements and nozzles on each substrate provide for an even higher density and higher quality recording. For example, if one row of nozzles corresponds to 90 dpi, recording heads 425 and 435 will each produce 360dpi. Furthermore, as shown in FIG. 27, nozzle plate 194 is mechanically secured to substrates 174 and 177 by a push plate 450. Consequently, recording head 435 is more reliable and durable than recording heads which have their substrates and nozzle plates bonded together merely by adhesive. Still further, a packing material 453 disposed on the interior surface of push plate 450 and spacially located between nozzle plate 194 and substrates 174 and 177 provides an absorption medium for any ink which may escape between nozzle plate 194 and substrates 174 and 177.

High quality ink jet recording on commonly used recording paper such as wood-free paper can be achieved by addition of an ionic or non-ionic surface active agent to an aqueous ink composition containing at least one wetting agent, at least one dye or pigment and water. Appropriate amounts of antiseptic, mold inhibitors, pH adjustors and chelating agents can also be added.

The surface active agent functions to increase permeability of the ink to the recording paper. Typical surface active agents are shown in Table 4.

TABLE 4

Ionic Surface Active Agents dioctyl sulfosuccinate sodium salt.
sodium oleate
dodecylbenzenesulfonic acid Non-Ionic Surface Active Agents diethylene glycol mono-n-butyl ether
triethylene glycol mono-n-butyl ether In the case of an ionic surface active agent, sufficient permeability is achieved when the ionic agent is added to the ink at the critical micelle concentration. The properties of the ink become unstable and nozzles in which the ink is used become clogged due to formation of surface active agent deposits when the concentration is greater than the critical micelle concentration. The preferred amount of ionic surface active agent is between about 0.5 and 3% by weight of the ink composition. Dioctyl sulfosuccinate sodium salt is a particularly suitable ionic surface active agent because it has a low kraft point or critical micelle concentration and deposits are not readily formed.

Non-ionic surface active agents having high molecular weights cause the solubility to be lowered and the ink viscosity to be increased. Non-ionic surface active agents having low molecular weights vaporize the ink as a result of their high vapor pressure and produce an offensive odor. The components of the ink using low molecular weight non-ionic surface active agents tend to change over time and increased nozzle clogging results. However, the non-ionic surface active agents shown in Table 4 can be used in a preferred amount of between about 5 and 50% by weight which is sufficient to permit the ink to permeate into the recording paper. A more preferred range is between about 10 and 30% by weight.

Conventional dyes and pigments can be used as coloring agents. In general, azo dyes, indigo dyes and phthalocyanine dyes including any of the following can be used:

C.I. Direct Black 19
C.I. Direct Black 22
C.I. Direct Black 38
C.I. Direct Black 154
C.I. Direct Yellow 12
C.I. Direct Yellow 26
C.I. Direct Red 13
C.I. Direct Red 17
C.I. Direct Blue 78
C I Direct Blue 90
C.I. Acid Black 52
C.I. Acid Yellow 25
C.I. Acid Red 37
C.I. Acid Red 52
C.I. Acid Red 254
C.I. Acid Blue 9

Any inorganic or organic pigment having a particle diameter between about 0.01 and 3μm can be used and is preferably diffused in the ink using a dispersant. Two or more coloring agents can be added in order to achieve a desired color.

Inks containing surface active agents permeate recording paper and disperse rapidly when the paper is contacted. Desirable amounts of coloring agent or pigment are between about 3 and 10% by weight. The optimum amount is between about 5 and 7% by weight.

A wetting agent or solvent can be used to prevent clogging of the nozzles in which the ink is used. The wetting agent can be one or more of glycerine, diethylene glycol, triethylene glycol, polyethylene glycol #200, polyethylene glycol #300 and polyethylene glycol #400. The wetting agent is used in an amount between about 9 and 70% by weight.

In addition to the surface active agent, pigment and wetting agent, appropriate amounts of antiseptic, mold inhibitors, pH adjusters and chelating agents can be added. The remainder of the ink is water.

The following ink compositions were prepared in accordance with the invention. These exemplary compositions are presented for purposes of illustration only and are not intended to be construed in a limiting sense.

| | |
|---|---|
| Ink B | |
| Wetting Agents - Glycerin | 15.0 wt. % |
| Polyethylene glycol #300 | 15.0 wt. % |
| Dioctyl sulfosuccinate sodium salt | 1.0 wt. % |
| Water | 61.8 wt. % |
| Proxel (a mold inhibitor manufactured by ICI Corporation, England) | 0.2 wt. % |
| Dye - C.I. Direct Black 154 | 7.0 wt. % |
| Ink C | |
| Wetting Agents - Triethylene glycol | 20.0 wt. % |
| Triethanolamine | 0.01–0.05 wt. % |
| Diethylene glycol mono-n-butyl ether | 40.0 wt. % |
| Water | 34.75–34.79 wt. % |
| Proxel | 0.2 wt. % |
| Dye - C.I. Direct Black 154 | 5.0 wt. % |
| Ink D | |
| Wetting Agents - Triethylene glycol | 20.0 wt. % |
| Triethanolamine | 0.01–0.05 wt. % |
| Diethylene glycol mono-n-butyl ether | 30.0 wt. % |
| Water | 44.75–44.79 wt. % |
| Proxel | 0.2 wt. % |
| Dye - C.I. Direct Black 22 | 5.0 wt. % |

Each of ink mixtures B, C and D was placed into a container and heated to a temperature between 60° and 80° with agitation. Each mixture was filtered under pressure using a membrane filter having a 1μm mesh. The resulting solutions were useful as printing inks.

Ink jet printing onto the wood-free papers shown in Table 5 was carried out using these inks in the ink jet recording apparatus of the invention. The printing conditions were a recording density of 360dpi, 48 nozzles and a driving frequency of 4KHz.

TABLE 5

| Manufacturer | Product |
|---|---|
| Oji-Seishi | Wood-free paper (ream weight 70 kg) |
| Kishu-Seishi | Fine PPC |
| Daishowa-Seishi | BM paper |
| Jujo-Seishi | Hakuba (wood-free paper) |

TABLE 5-continued

| Manufacturer | Product |
|---|---|
| Fuji-Xerox | P |
| Xerox (U.S.A.) | 10 series Smooth 3R54 |
| Xerox (U.S.A.) | 4024 Supply net 3R721 |
| Kimberley Clark (U.S.A.) | Neenah bond paper |

Each of Inks B, C and D was fixed onto each of the papers shown in Table 5 and high quality printing was obtained in each case.

An alternative method for achieving high quality ink jet printing on recording paper is to preheat the recording paper prior to attaching the ink droplets and postheat the recording paper after attaching the ink droplets. In addition, the ink droplets are attached in a swollen condition. This causes the ink to dry and fix on the recording paper quickly.

Figures 28, 29:
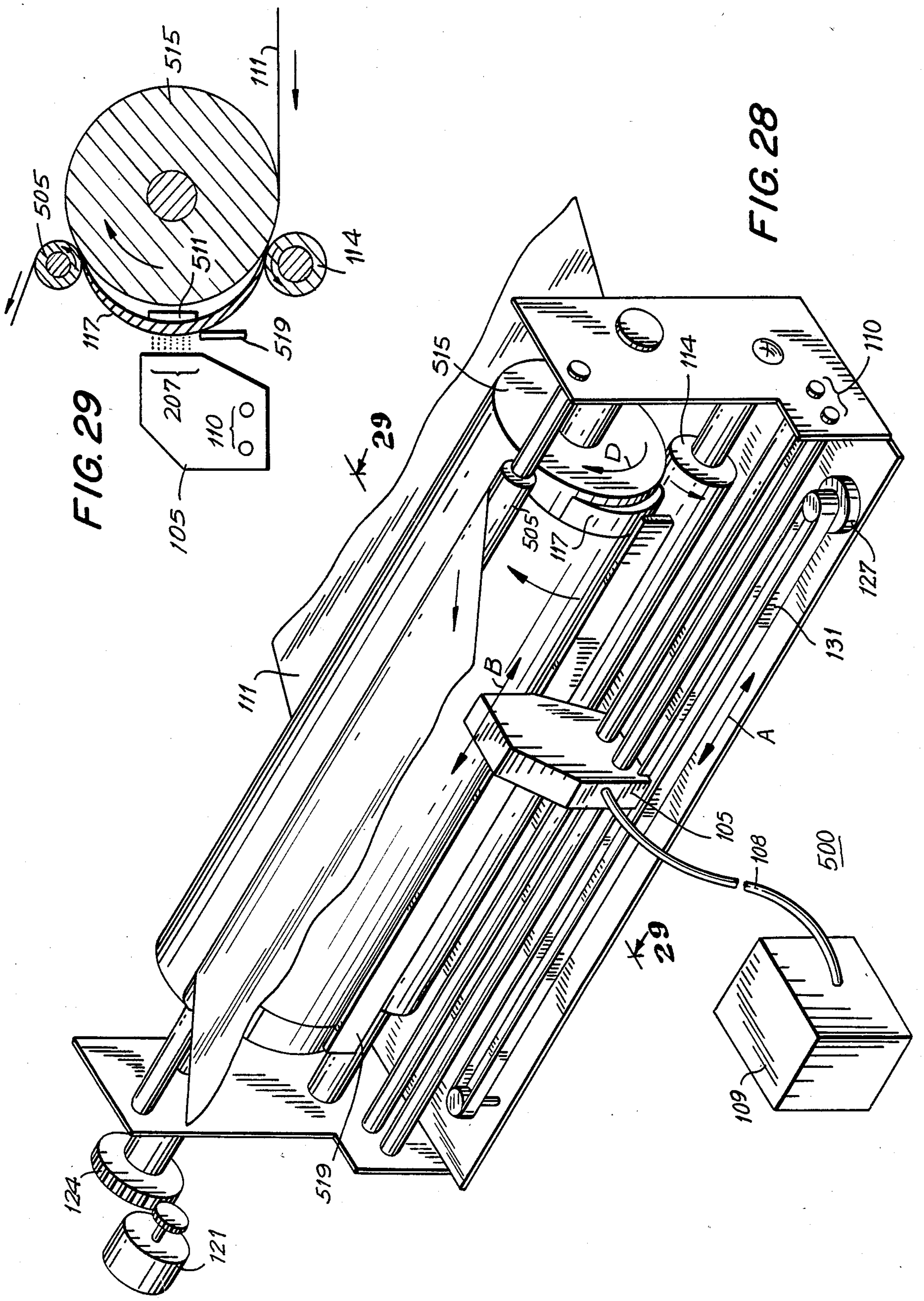
FIG. 28 is a fragmentary perspective view of a thermal ink jet recording apparatus in accordance with yet another alternative embodiment of the invention.
FIG. 29 is a side elevational view partially in crosssection taken along lines 29—29 of FIG. 28.

FIGS. 28 and 29 show an apparatus constructed and arranged in accordance with the invention in which the method of preheating and postheating the recording paper can be utilized. The basic construction of apparatus 500 is the same as that of FIG. 3. A heating element 511, however, is used to heat recording paper 111 and is provided inside platen 117. Recording paper 111 is preheated and postheated while printing is performed at a temperature between about 100° and 140° C. A curl straightening roller 505 is provided in order to straighten the curl caused by the preheating and postheating of recording paper 111. A paper press 519 presses paper 111 against platens 117. A paper feed roller 515 and guide rollers 114 advance paper 111 past recording head 105. Ink droplets ejected from nozzles 207 are attached to preheated recording paper 111. The water in the ink has a higher vapor pressure than the remainder of the ink and vaporizes first, leaving the remaining components such as solvents and coloring agents fixed on recording paper 30.

PTC thermistors or sheathed heaters can be used to heat element 511 as shown in FIG. 29. In a preferred embodiment, heating element 511 includes 5 PTC thermistors, each of which has a diameter of 17mm, a thickness of 2.5mm, an average resistance of 20Ω at room temperature and a Curie point of 150° C. The thermistors are coupled in parallel and are provided on the inside surface of platen which is constructed of aluminum having an average thickness of 2mm. The surface of platen 117 does not contact recording paper 111. Platen 117 has a self-controlled temperature due to the Curie point of the PTC thermistors. The heat loss due to dissipation by platen 117 and transfer resistance from heating element 511 can be compensated when the Curie point is greater than the preheating and postheating temperature of recording paper 111. The limits of the preheating and postheating regions change as a function of the components of the ink, the number of ink droplets, the recording speed and the recording density desired. In a preferred embodiment, the preheated region corresponds to 4 lines and the postheated region corresponds to 8 lines.

Suitable inks for use in this type of preheating and postheating system have a surface tension of solvent and coloring agent remaining on the recording paper at 100° C. of greater than about 35mN/m. Such inks can have a coloring agent, wetting agent, solvent and water. Appropriate amounts of antiseptic, mold inhibitors, pH adjustors and chelating agents can also be used.

The coloring agents discussed above can be used in ink compositions prepared for use with the preheating and postheating method. The amount of coloring agent is generally between about 0.5 and 10% by weight. A more preferred amount of coloring agent is between about 0.5 and 5% by weight and is optimally between about 1 and 3% by weight.

A wetting agent is also used. Any of glycerine, diethylene glycol, triethylene glycol, polyethylene glycol #200, polyethylene glycol #300, polyethylene glycol #400, thiodiglycol, diethylene glycol monomethyl ether and diethylene glycol diethyl ether can be used alone or in combination. The amount of wetting agent is between about 5 and 20% by weight of the ink composition. The nozzles in which the ink is used become clogged when less than about 5% by weight of wetting agent is used. On the other hand, the ink droplets formed on the recording paper are not easily dried when the amount of wetting agent is greater than about 20%.

Appropriate amounts of antiseptic, mold inhibitors, pH adjustors and chelating agents are also used in the ink composition, with the remainder of the composition being water.

A solvent such as a primary alcohol can be added to the ink in order to improve drying characteristics. The solvent can be selected from methyl alcohol, ethyl alcohol, isopropanol and the like and mixtures thereof. The solvent can be used in an amount between about 3 and 30% by weight of the composition and can be added in place of an equivalent amount of water.

After extensive testing, it became clear that the surface tension of the solvent and the coloring agent contained in the ink remained on the recording paper during printing and affected the print quality. Specifically, inks wherein the surface tension of the solvent and coloring agent remaining on the recording paper was 35mN/m or greater at 100° C. were suitable for high quality ink jet printing.

The following inks were prepared in accordance with the invention and are presented for purposes of illustration only.

| | |
|---|---|
| Ink E | |
| Wetting Agent - Glycerin | 10.0 wt. % |
| Water | 88.4 wt. % |
| Proxel | 0.1 wt. % |
| Dye - C.I. Direct Black 154 | 1.5 wt. % |
| Ink F | |
| Wetting Agent - Thiodiglycol | 10.0 wt. % |
| Water | 88.9 wt. % |
| Proxel | 0.1 wt. % |
| Dye - C.I. Acid Red 37 | 1.0 wt. % |
| Ink G | |
| Wetting Agents - Glycerin | 5.0 wt. % |
| Diethylene glycol | 3.0 wt. % |
| Thiodiglycol | 2.0 wt. % |
| Water | 87.8 wt. % |
| Proxel | 0.2 wt. % |
| Dye - C.I. Direct Black 22 | 2.0 wt. % |
| Ink H | |
| Wetting Agent - Thiodiglycol | 5.0 wt. % |
| Solvents - Methyl alcohol | 10.0 wt. % |
| Ethyl alcohol | 10.0 wt. % |
| Isopropanol | 10.0 wt. % |
| Water | 63.8 wt. % |
| Proxel | 0.2 wt. % |
| Dye - C.I. Acid Yellow 25 | 1.0 wt. % |
| Ink I | |
| Wetting Agent - Propylene glycol | 10.0 wt. % |
| Water | 88.4 wt. % |
| Proxel | 0.1 wt. % |
| Dye - C.I. Direct Black 154 | 1.5 wt. % |

-continued

| Ink J | |
|---|---|
| Solvent - Dimethyl sulfoxide | 10.0 wt. % |
| Water | 88.4 wt. % |
| Proxel | 0.1 wt. % |
| Dye - C.I. Direct Black 154 | 1.5 wt. % |

Each ink mixture was placed in a separate container and heated to between about 60° and 80° C. with sufficient agitation. The mixtures were then filtered under pressure using a membrane filter having an aperture diameter of 1μm to obtain printing inks.

Ink jet printing was carried out on the wood-free papers shown in Table 5 using each of these inks in an ink jet recording apparatus of the invention. The printing conditions were a recording density of 360dpi, 48 nozzles and a driving frequency of 4KHz.

10 grams of each ink was placed on the scale and maintained in a thermostatic chamber at 80° C. It was confirmed that water had vaporized by measuring the weight a second time. The surface tension of the components remaining at 100° C. and the print quality obtained are shown in Table 6.

TABLE 6

| Ink | Surface Tension at 100° C. | Printing Quality* |
|---|---|---|
| E | 54 mN/m | 5 |
| F | 46 | 5 |
| G | 39 | 4-3 |
| H | 37 | 4-3 |
| I | 28 | 1 |
| J | 33 | 2 |

*Note the higher the number, the better the print quality.

As can be seen in Table 6, good print quality was obtained when inks E, F, G and H were used. Furthermore, after extensive testing, it became clear that the ink compositions were not limited to those of inks E, F, G and H. Excellent quality printing was achieved by inks having between about 0.5 and 10% by weight of a coloring agent, between about 5 and 20% by weight of a polyhydric alcohol such as one or more of glycerin, diethylene glycol, triethylene glycol, polyethylene glycol #200, polyethylene glycol #300, polyethylene glycol #400, thiodiglycol, diethylene glycol monomethyl ether, and dietheylene glycol dimethyl ether and the remainder water with a small amount of antiseptic, molding inhibitor, pH adjustor and chelating agent. Alternatively, between about 3 and 30% by weight of methyl alcohol, ethyl alcohol or isopropanol can be used in place of an equivalent amount of water. When each ink was heated to 100° C., the surface tension of the mixture of solvent and coloring agent that remained on the recording paper was greater than about 35nM/m.

The life of the recording head was the same as that of the life of a recording head using ink A when any of inks B, C, D, E, F, G or H was used. These inks can be used in conventional thermal ink jet recording heads as well as in recording heads constructed and arranged in accordance with the invention and high quality printing on commonly used recording paper such as wood-free paper can be achieved. These inks can be quickly fixed on recording paper so that high quality pictures can be obtained without wrinkling or blotting of the paper.

As now can be readily appreciated, the invention provides an ink jet recording apparatus having high speed, high print density and high reliability. The invention provides a recording head which is simply and easily constructed and does not require a protective layer covering the heating element or a barrier to prevent crosstalk. The invention provides high picture quality using the inks described above and multicolor recordings of high density and picture quality.

It will thus be seen that the objects set forth above, among those made apparent from the preceding description, are efficiently attained and, since certain changes may be made in carrying out the above process, in the described product, and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A thermal ink jet recording apparatus comprising ink, heating elements for heating the ink and selected from the group of materials consisting of Ta-N-$siO_2$ and Ta-$SiO_2$ so that at least a portion of the entire surface of each heating element is disposed for direct contact with the ink, and a thin film circuit including electrodes for supplying electricity to said heating elements, said heating elements disposed so as to cover said thin film circuit.

* * * * *